United States Patent
Shiomichi

(10) Patent No.: US 9,250,557 B2
(45) Date of Patent: Feb. 2, 2016

(54) OPTICAL SCANNING DEVICE AND IMAGE FORMING APPARATUS PROVIDED WITH SAME

(71) Applicant: CANON KABUSHIKI KAISHA, Tokyo (JP)

(72) Inventor: Hirotaka Shiomichi, Suntou-gun (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 13/909,877

(22) Filed: Jun. 4, 2013

(65) Prior Publication Data

US 2013/0328986 A1    Dec. 12, 2013

(30) Foreign Application Priority Data

Jun. 8, 2012  (JP) ................. 2012-131291

(51) Int. Cl.
*B41J 2/47* (2006.01)
*G03G 15/04* (2006.01)
*G03G 15/043* (2006.01)
*G01D 15/14* (2006.01)
*H01J 29/70* (2006.01)
*H01J 33/00* (2006.01)

(52) U.S. Cl.
CPC ........ *G03G 15/04036* (2013.01); *G03G 15/043* (2013.01); *G03G 15/04072* (2013.01)

(58) Field of Classification Search
CPC .......... G06K 15/1209; G06K 15/1223; H04N 1/113; H04N 1/1135; H04N 1/40037; H04N 1/0446; G03G 15/326; B41J 2/47; B41J 2/473
USPC .................. 347/253, 229, 234, 235, 248, 250
See application file for complete search history.

(56) References Cited

U.S. PATENT DOCUMENTS

| 4,853,710 | A  | * | 8/1989 | Shimada et al. ............... 347/261 |
| 4,890,288 | A  | * | 12/1989 | Inuyama et al. ................ 372/31 |
| 7,158,163 | B2 | * | 1/2007 | Komiya et al. ............... 347/224 |
| 7,564,205 | B2 | * | 7/2009 | Sugimoto ................ 318/400.01 |
| 8,723,907 | B2 | * | 5/2014 | Takezawa ............ G03G 15/043 347/235 |
| 2012/0147119 | A1 | | 6/2012 | Toyoizumi et al. | |

FOREIGN PATENT DOCUMENTS

| JP | 2001158130 A | 6/2001 |
| JP | 2003312050 A | 11/2003 |
| JP | 2004122442 A | 4/2004 |
| JP | 2005153451 A | 6/2005 |
| JP | 2007192967 A | 8/2007 |
| JP | 2012137743 A | 7/2012 |

\* cited by examiner

*Primary Examiner* — Jannelle M Lebron
*Assistant Examiner* — Jeremy Bishop
(74) *Attorney, Agent, or Firm* — Canon USA Inc., IP Division

(57) ABSTRACT

An image forming apparatus includes a driving unit configured to drive a light-emitting element for emitting a laser beam; a rotational polygon mirror scans a photosensitive member with the laser beam. The driving unit executes a first adjustment for causing the light-emitting element to emit light at a first light emission intensity to adjust a first driving current, and a second adjustment for causing the light-emitting element to emit light at a second light emission intensity to adjust a second driving current. During a time period after the polygon mirror has started rotating until a predetermined speed is reached, the driving unit performs the first adjustment and the second adjustment, after the polygon mirror has started rotating and before performing the first adjustment, performs the second adjustment.

8 Claims, 18 Drawing Sheets

FIG. 7A OPERATION MODE
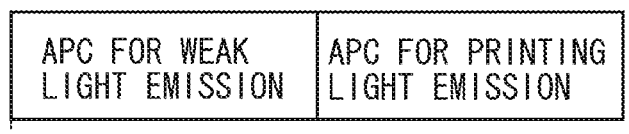
FIG. 7B LASER DRIVING CURRENT
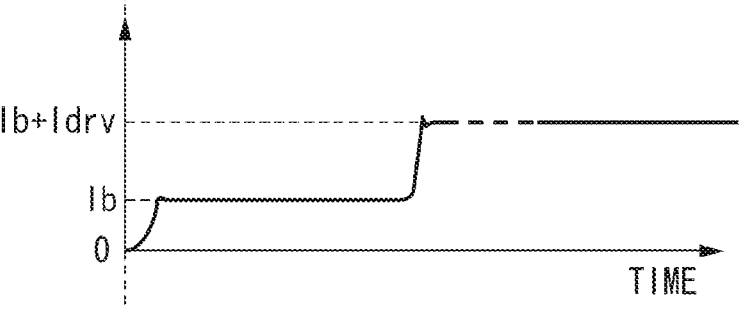
FIG. 7C LASER LIGHT AMOUNT
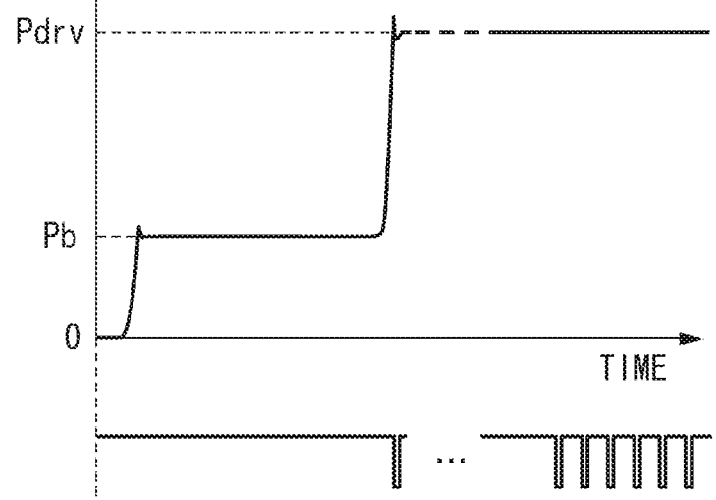
FIG. 7D BD SIGNAL
FIG. 7E ROTATIONAL SPEED OF SCANNER MOTOR
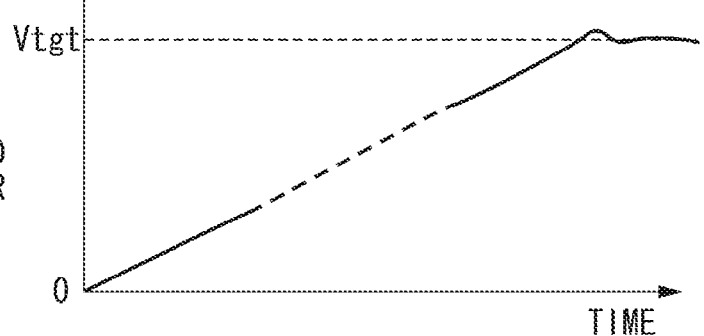

OPERATION MODE

A: APC FOR WEAK LIGHT EMISSION
B: APC FOR PRINTING LIGHT EMISSION

LASER DRIVING CURRENT

LASER LIGHT AMOUNT

BD SIGNAL

ROTATIONAL SPEED OF SCANNER MOTOR

OPERATION MODE

A: APC FOR WEAK LIGHT EMISSION
B: APC FOR PRINTING LIGHT EMISSION
C: LASER PUT OUT

LASER DRIVING CURRENT

LASER LIGHT AMOUNT

BD SIGNAL

ROTATIONAL SPEED OF SCANNER MOTOR

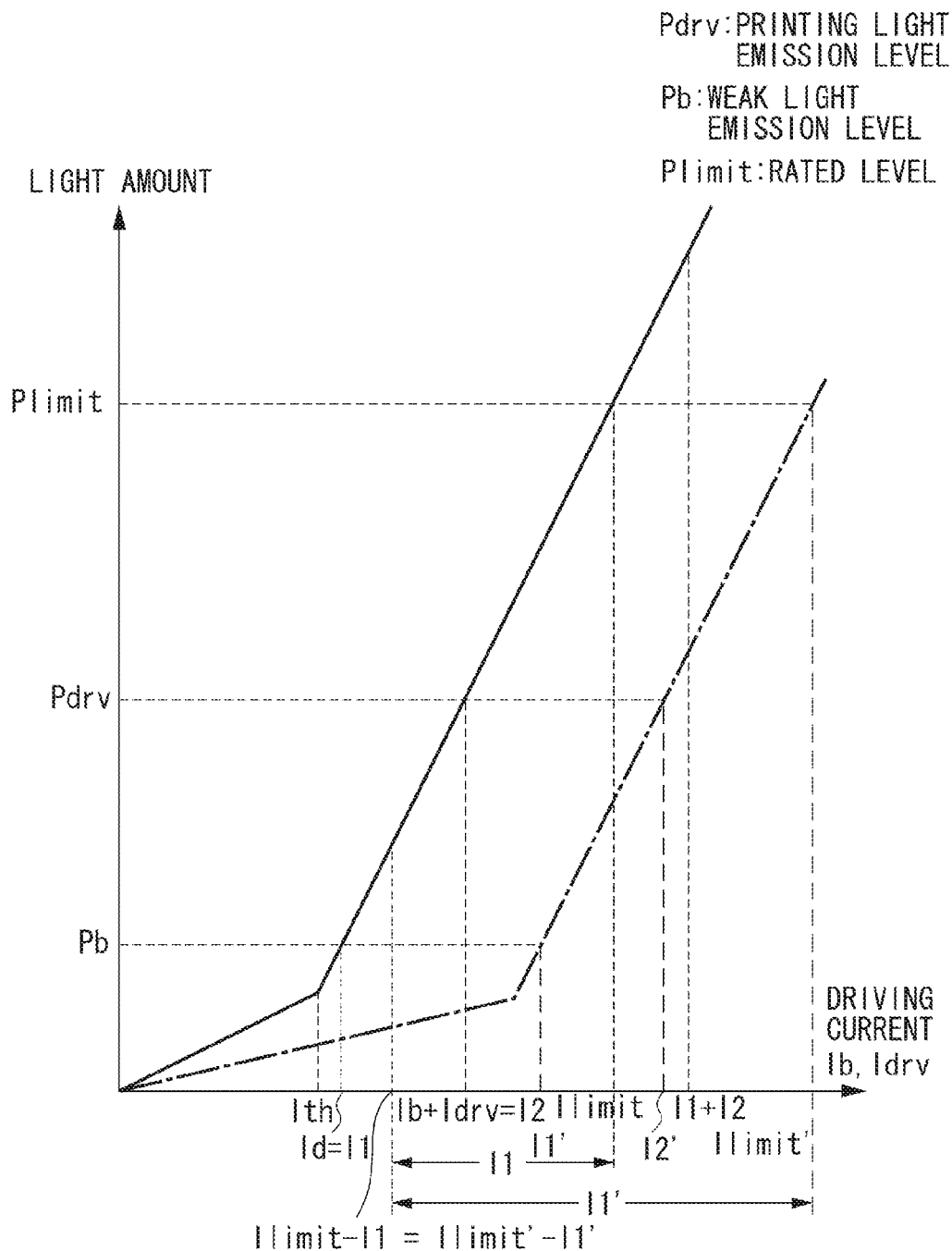

OPERATION MODE

LASER DRIVING CURRENT

LASER LIGHT AMOUNT

BD SIGNAL

ROTATIONAL SPEED OF SCANNER MOTOR

OPERATION MODE

LASER DRIVING CURRENT

LASER LIGHT AMOUNT

BD SIGNAL

ROTATIONAL SPEED OF SCANNER MOTOR

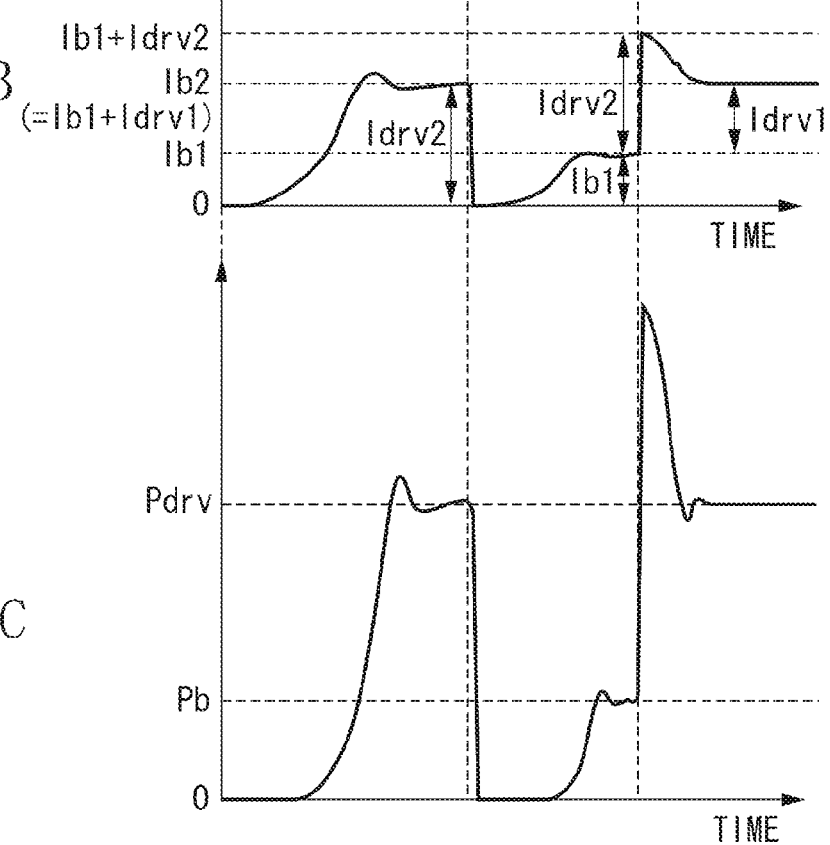
FIG. 18A OPERATION MODE
FIG. 18B LASER DRIVING CURRENT
FIG. 18C LASER LIGHT AMOUNT

OPTICAL SCANNING DEVICE AND IMAGE FORMING APPARATUS PROVIDED WITH SAME

BACKGROUND OF THE INVENTION

1. Field of the Invention

The present invention relates to an image forming apparatus that employs an electrophotographic recording process to form an image. Examples of such image forming apparatus include a laser printer, a copying machine, a facsimile machine, of a multifunction printer (MFP).

2. Description of the Related Art

In know image forming apparatuses that use the electrophotographic recording process, there is a phenomenon called "white gap". White gap is an undesirable printing artifact, in which a white gap appears which should not be present, between images formed adjacent to (or overlaid on) each other in different colors. The phenomenon occurs resulting from the fact that an electrostatic latent image, for example, an image edge portion where drum surface potential steeply changes is formed, on a photosensitive drum, and when this region is developed by a development device, a visualized image is formed thinner than originally intended. For example, in an image where a band of cyan color and a band of black color are made adjacent to each other, the band of cyan and the band of black ought to be formed adjacent to each other without a blank space therebetween, but respective visualized images are formed thin, and a gap (blank space) is produced between the cyan and black colors in a final image formed on a recording material. This type of undesired artifact is known as "white gap", but in generally refers to a blank space.

FIG. 17 is a diagram illustrating simplified details of the white gap phenomenon pertaining to conventional technology. Specifically, FIG. 17 illustrates a state of an electric field (E-field) interaction between a development roller and a photosensitive drum during an electrophotographic recording process. Thinning of the image of visualized image portion, which causes the white gap, is attributable to winding up of the electric field (winding E-field) at an edge portion of the electrostatic latent image in an electrostatic portion formed on the photosensitive drum.

To address this problem, there is known a method for preventing thinning of an image by causing a light-emitting element of a laser scanner to emit weak light which is not enough to cause the toner to adhere, on a non-image portion (non-toner image forming portion) in the whole surface of printable region. Hereinbelow, the method is referred to as background exposure, or weak light emission for non-image portion.

The object of performing weak light emission for a non-image portion is not limited to prevention of the white gap. As discussed in Japanese Patent Application Laid-Open No. 2003-312050, the weak light emission for a non-image portion is also carried out as a measure to decrease transfer potential contrast, and to prevent an image distortion induced by an aerial discharge which is generated at transfer nip portion. In other words, the weak light emission for non-image portion is not limited to a specific purpose.

As a specific approach for the weak light emission for non-image portion, for example, a method called a pulse-width modulation (PWM) process for changing a duty cycle of a pulse wave is discussed in Japanese Patent Application Laid-Open No. 2003-312050. In this method, the light-emitting element of a laser scanner is caused to emit light in the non-image portion at a pulse-width corresponding to a weak light emission amount in synchronization with an image clock which shows a fixed frequency.

In recent years, higher image quality has been required in color image forming apparatuses. Under such situation, in addition to an adjustment of light emission amount corresponding to the image portion, appropriately adjusting a light amount in the weak light emission of the non-image portion described above becomes important. In other words, it has become important to make an appropriate adjustment to enable one light-emitting element to emit two light emission intensities.

SUMMARY OF THE INVENTION

One object of the present invention is to provide an image forming apparatus capable of making an appropriate adjustment in a light-emitting element to emit two light emission intensities, so as to prevent the formation of a white gap or blank spaces between adjacent colors.

According to an aspect of the present invention, an image forming apparatus includes a photosensitive member, a light-emitting element for emitting a laser beam, a driving unit configured to drive the light-emitting element with a driving current, wherein the driving unit causes the light-emitting element to emit light at a first light emission intensity and at a second light emission intensity lower than the first light emission intensity, and a polygon mirror configured to scan the photosensitive member with the laser beam while rotating at a predetermined speed. The driving unit causes the light-emitting element to emit light at the first light emission intensity with a driving current obtained by adding a second driving current to a first driving current, and causes the light-emitting element to emit light at the second light emission intensity with the second driving current. The driving unit executes a first adjustment for causing the light-emitting element to emit light at the first light emission intensity to adjust the first driving current, and a second adjustment for causing the light-emitting element to emit light at the second light emission intensity to adjust the second driving current. The driving unit performs the first adjustment and the second adjustment during a time period after the polygon mirror starts rotating until the predetermined speed is reached, and performs the second adjustment after the polygon mirror has started rotating and before the first adjustment is performed.

According to another aspect of the present invention, an image forming apparatus includes a photosensitive member, a light-emitting element for emitting a laser beam, a driving unit configured to drive the light-emitting element with a driving current, wherein the driving unit causes the light-emitting element to emit light at a first light emission intensity and at a second light emission intensity lower than the first light emission intensity, and a polygon mirror configured to scan the photosensitive member with the laser beam while rotating at a predetermined speed. The driving unit causes the light-emitting element to emit light at the first light emission intensity with a driving current obtained by adding a second driving current to a first driving current, and causes the light-emitting element to emit light at the second light emission intensity with the second driving current. The driving unit executes a first adjustment for causing the light-emitting element to emit light at the first light emission intensity to adjust the first driving current, and a second adjustment for causing the light-emitting element to emit light at the second light emission intensity to adjust the second driving current. During a time period after the polygon mirror starts rotating until the predetermined speed is reached, the driving unit performs the first adjustment and the second adjustment, and after the polygon mirror has started rotating and before the first adjustment and the second adjustment are performed, causes the light-emitting element to emit light at a third light emission intensity lower than the first light emission intensity to perform a third adjustment for adjusting the first driving current.

According to yet another aspect of the present invention, an image forming apparatus includes a photosensitive member, a light-emitting element for emitting a laser beam, a driving unit configured to drive the light-emitting element with a driving current, wherein the driving unit causes the light-emitting element to emit light at a first light emission intensity and at a second light emission intensity lower than the first light emission intensity, and a polygon mirror configured to scan the photosensitive member with the laser beam while rotating at a predetermined speed. The driving unit causes the light-emitting element to emit light at the first light emission intensity with a driving current obtained by adding a second driving current to a first driving current, and causes the light-emitting element to emit light at the second light emission intensity with the second driving current. The driving unit executes a first adjustment for causing the light-emitting element to emit light at the first light emission intensity to adjust the first driving current, and a second adjustment for causing the light-emitting element to emit light at the second light emission intensity to adjust the second driving current. During a time period after the polygon mirror starts rotating until the predetermined speed is reached, the driving unit performs the first adjustment and the second adjustment, and after the polygon mirror has started rotating and before the second adjustment and the second adjustment are performed, causes the light-emitting element to emit light at the first light emission intensity with a driving current obtained by adding the second driving current of a predetermined value to the first driving current to perform the first adjustment for adjusting the first driving current.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIGS. 7A to 7E are diagrams illustrating temporal changes of laser driving current, laser light amount, BD signal, rotational speed of scanner motor, in the processing of startup sequence.

FIG. 13 is a graph illustrating a relationship between current flowing through the laser diode and light amount.

FIGS. 18A, 18B, and 18C are diagrams illustrating temporal changes of laser driving current, and control of laser light amount.

DESCRIPTION OF THE EMBODIMENTS

Various exemplary embodiments, features, and aspects of the invention will be described in detail below with reference to the drawings.

However, the components described in the first exemplary embodiment are only illustrative, and it is not intended to limit the scope of the invention only to these.

[Image Forming Apparatus]

Figure 1:
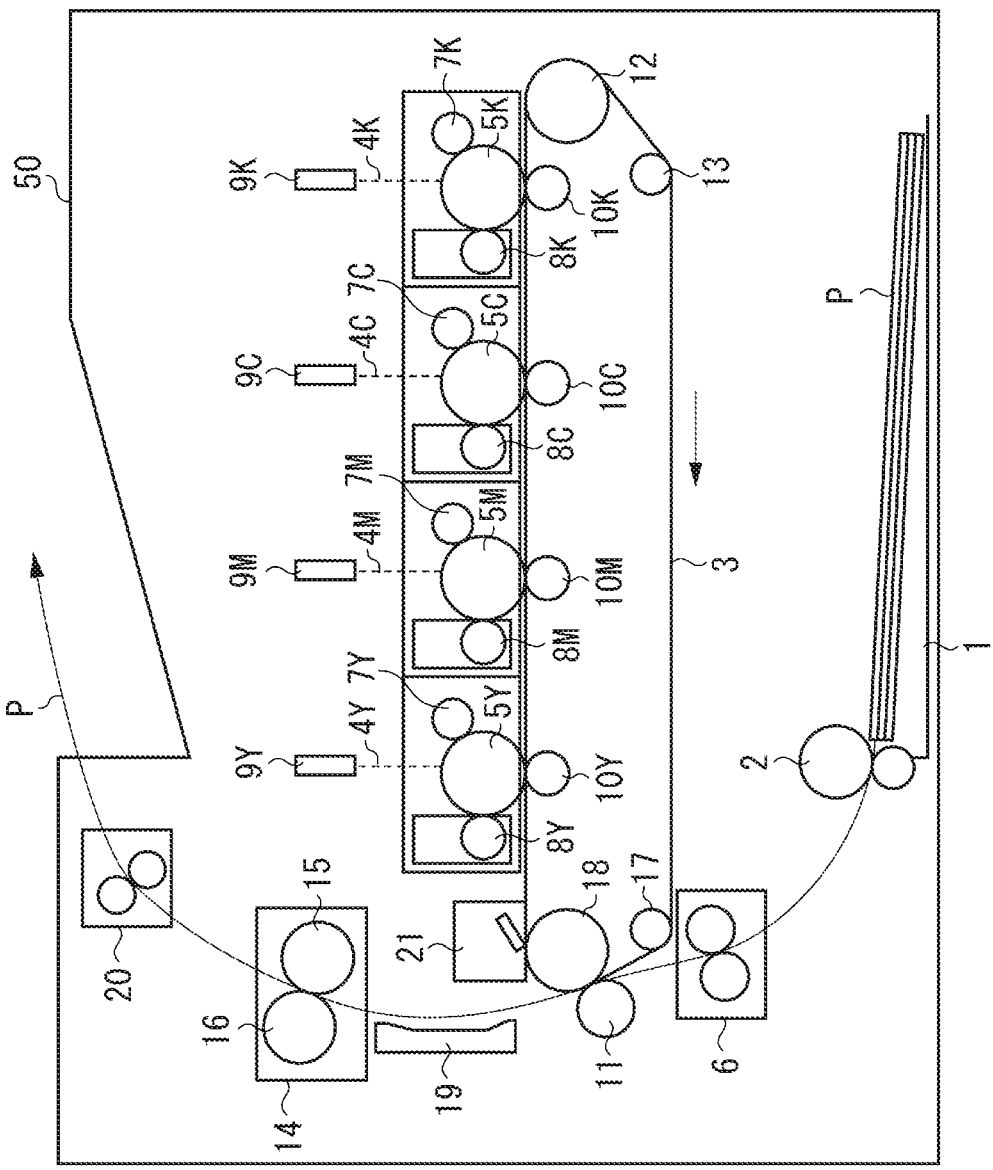
FIG. 1 is a diagram illustrating an example of schematic cross-sectional view of an image forming apparatus.

FIG. 1 is a schematic cross-sectional view of a color image forming apparatus. In the descriptions below, descriptions will be provided with reference to the schematic cross-sectional view of the color image forming apparatus, but it is not limited to this. The weak light emission of the non-image portion as will be described below in detail can be also applied to, for example, a single color image forming apparatus. Hereinbelow, descriptions will be provided taking an in-line type color image forming apparatus as an example however, a rotary type color image forming apparatus may also be used. Hereinbelow, the in-line type color image forming apparatus will be described in detail by way of example.

As illustrated in FIG. 1, a color laser printer 50 is a printer which includes photosensitive drums 5 (5Y, 5M, 5C, 5K) serving as first image bearing members, and continuously transfers images formed on the photosensitive drums onto an intermediate transfer belt 3 serving as a second image bearing member in sequential manner, to thereby obtain a full-color print image. This type of the printer is referred to as an in-line type or 4-tandem drum type.

Optical scanning devices (laser scanners) 9 (9Y, 9M, 9C, 9K) each irradiate the corresponding photosensitive drums 5 with light, to expose the photosensitive drums 5.

The intermediate transfer belt 3 is an endless-shaped belt (hereinafter, referred to as an endless belt), and is suspended by a driving roller 12, a tension roller 13, an idler roller 17, and a secondary transfer counter roller 18, and is circulated at a process speed of 115 mm/sec in a direction of an arrow in FIG. 1. The driving roller 12, the tension roller 13, and the secondary transfer counter roller 18 are supporting rollers that support the intermediate transfer belt 3. The driving roller 12, and the secondary transfer counter roller 18 are configured to be φ24, and the tension roller 13 is configured to be φ16.

Four photosensitive drums 5 (5Y, 5M, 5C, 5K) are arranged in series in a movement direction (clockwise) of the intermediate transfer belt 3. The photosensitive drum 5Y having a yellow development device is uniformly charged to a predetermined polarity/potential by a primary charging roller 7Y in the process of rotation, and is subsequently subjected to an image exposure 4Y with light irradiated by the image exposure unit 9Y. Accordingly, an electrostatic latent image corresponding to a first color (yellow) component image of the target color image is formed. Then, yellow toner as a first color adheres to the electrostatic latent image, thereby the latent image is developed by a first development device (yellow development device) 8Y. Accordingly, visualization of images is performed. In this way, a process in which toner is developed at a portion where the electrostatic latent image has been formed by the image exposure, is referred to as "reverse-developing process".

Yellow image formed on the photosensitive drum 5Y enters into primary transfer nip portion of the intermediate transfer belt 3. At the primary transfer nip portion, a voltage applying member (primary transfer roller) 10Y is brought into contact with and abut against the back side of the intermediate transfer belt 3. A primary transfer bias power source (not illustrated) is connected to the voltage applying member 10Y for enabling bias application. Firstly yellow at a port of the first color is transferred, and then sequentially respective colors of magenta, cyan, and black are transferred onto the intermediate transfer belt 3, from the photosensitive drums 5M, 5C, and 5K corresponding to the respective colors after going through the steps described previously. The toner images of four colors transferred onto the intermediate transfer belt 3 is circulated and moved in the direction of the arrow (clockwise) in FIG. 1, along with the intermediate transfer belt 3.

On the other hand, the recording material P stored in stack in a paper cassette 1, is fed by a paper roller 2, and is conveyed to a nip portion of a registration roller pair, and temporarily stopped. The temporarily stopped recording material P is supplied to the secondary transfer nip by a registration roller pair 6 in synchronization with the timing that the toner images of four colors formed on the intermediate transfer belt 3 reach a secondary transfer nip. Then, the toner images on the intermediate transfer belt 3 are transferred onto the recording material P by voltage application (approximately +1.5 kV) between a secondary transfer roller 11 and the secondary transfer counter roller 18.

The recording material P onto which the toner image has been transferred, is separated from the intermediate transfer belt 3, and is sent to a fixing device 14 via a conveyance guide 19. At the fixing device 14, the toner image on the surface is fused and fixed by a fixing roller 15 and a pressure roller 16 heating/pressing the recording material P. Accordingly, an image of 4-color full-color is obtained. Thereafter, the recording material P is discharged from a discharge roller pair 20 to the outside of the image forming apparatus, and one cycle of printing ends. On the other hand, toner left on the intermediate transfer belt 3 without being transferred onto the recording material P in the secondary transfer unit is removed by a cleaning unit 21 arranged on a downstream side of the secondary transfer unit.

The above are descriptions of the schematic cross-sectional view of the image forming apparatus. Next, hereinbelow, in connection with the laser driving system, first, the optical scanning devices (laser scanners) 9 (9Y, 9M, 9C, 9K) will be described, and thereafter a circuit configuration of a laser driving system will be described in detail.

[Optical Scanning Device]

Figure 2:
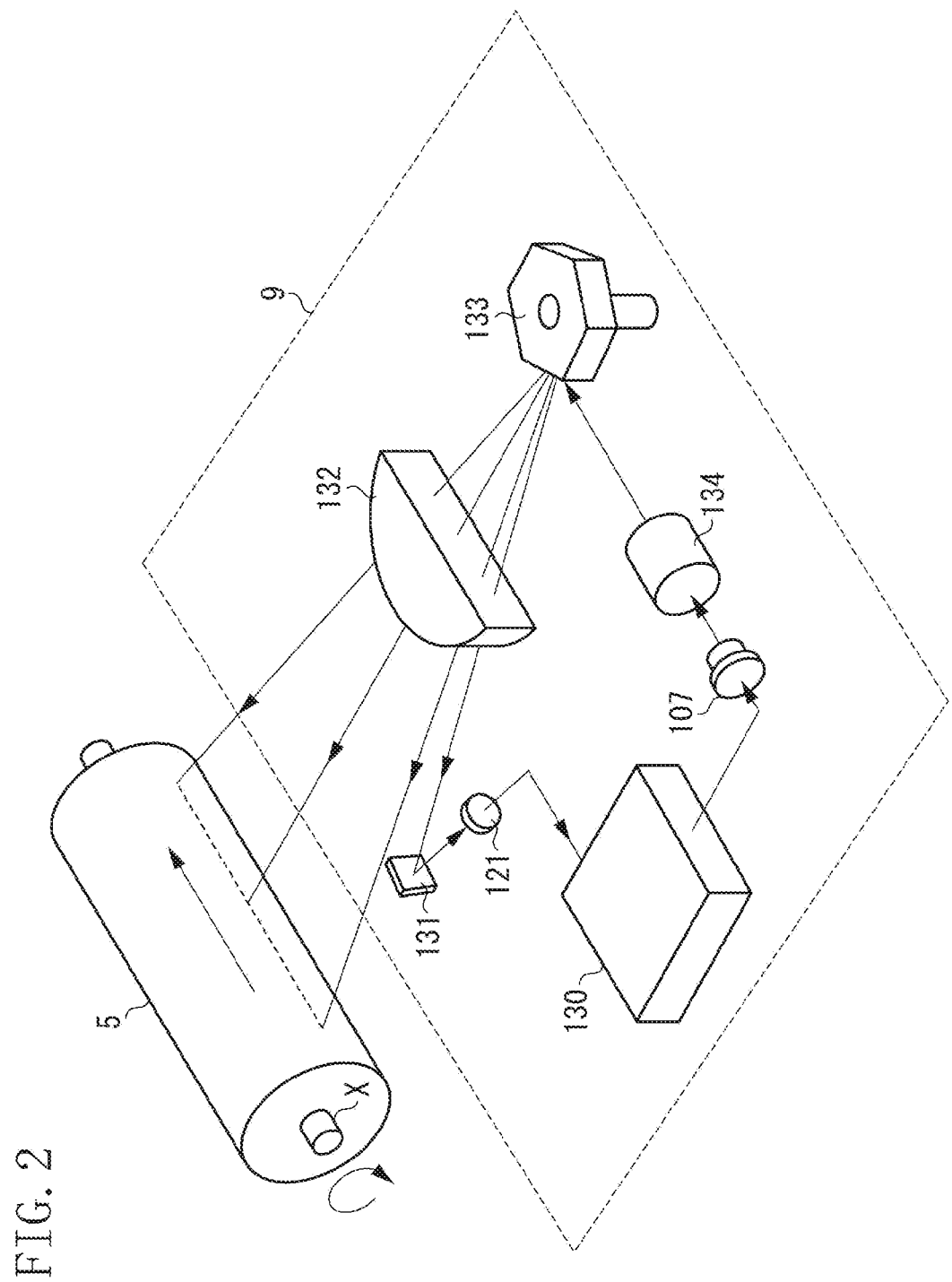
FIG. 2 is a diagram illustrating an outline of an optical scanning device.

FIG. 2 illustrates a schematic view of the optical scanning device 9. The optical scanning device 9 is used to expose one photosensitive drum 5, and the optical scanning device 9 includes the similar optical scanning devices 9Y, 9M, 9C, and 9K each provided corresponding to the photosensitive drums 5Y, 5M, 5C, and 5K. These optical scanning devices 9Y, 9M, 9C, and 9K have the similar configuration, and hereinbelow, one of them will be described as a representative for the optical scanning device 9.

A laser diode (hereinafter referred to as an LD 107) serves as a light-emitting element. A driving current flows through the LD 107 based on an operation of the laser driving system circuit 130. The LD 107 emits a laser beam at a light amount level determined according to the driving current. The laser driving system circuit 130 is a circuit for driving the LD 107 electrically connected to an engine controller 122 and a video controller 123 described below.

Then, a beam shape of the laser beams emitted by the LD 107 is formed by a collimator lens 134, and is made parallel beams. After that, the laser beams are scanned (refection direction is continuously changed) in a rotating axis X of the photosensitive drum 5 by a polygon mirror (polygon mirror) 133. The scanned laser beams form an image as dot-like spots on the surface of the photosensitive drum 5 as a scanned surface which is rotated around the rotating axis X, through an f-θ lens 132. The spots are moved (main-scanning) in a direction of the rotating axis X by the rotation of the polygon mirror 133. By scanning the light on the photosensitive drum 5 in this way, the optical scanning device 9 exposes the photosensitive drum 5.

On the other hand, a reflection mirror 131 is provided corresponding to a scanning position on one end of the photosensitive drum 5, and the laser beams projected on a scanning starting position are reflected toward a sync detection signal element (BD (beam detection) element) 121 serving as a light receiving unit. Then, a starting timing of scanning of the laser beams is determined by an output of the BD element 121. At the time of forced light emission in the detection of the laser beams, an auto power control (APC) which is an automatic light amount adjustment of laser light amount is performed, and light emission level of the laser beams is adjusted.

[Laser Driving System]

Figure 3:
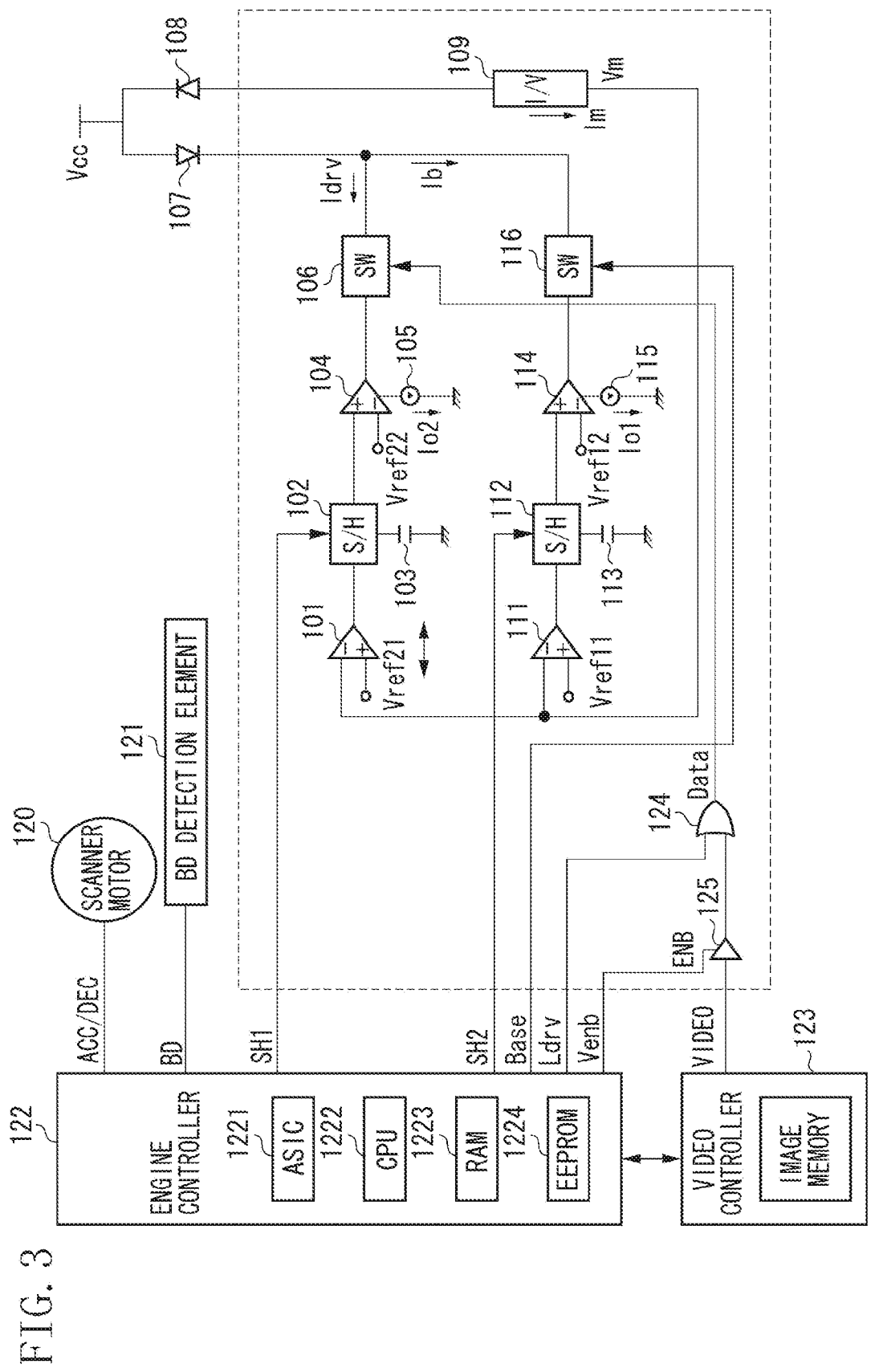
FIG. 3 is a diagram illustrating a laser driving circuit.

FIG. 3 is a laser driving system circuit (driving unit) which automatically adjusts an appropriate light amount level of the LD 107 in performing weak light emission, so as to prevent adherence of the toner to the photosensitive drum, and to prevent occurrence of fogs or reverse fogs in the non-image portion.

In FIG. 3, the laser driving system circuit 130 illustrated in FIG. 2 corresponds to a circuit surrounded by a dotted line frame. The laser driving system circuit includes comparator circuits 101, 111, sample and hold circuits 102, 112, hold capacitors 103, 113, current amplifier circuits 104, 114, reference current sources (constant current circuits) 105, 115, switching circuits 106, 116, and current-voltage conversion circuit 109. A laser diode 107, a photodiode 108, a scanner motor 120 that drives and rotates the polygon mirror 133, and a BD element 121 are provided outside the dotted line frame. Hereinbelow, a photodiode 108 is referred to as a PD 108. As described below in detail, circuit portions 101 to 106 correspond to a first light amount adjustment unit, and circuit portions 111 to 116 correspond to a second light amount adjustment unit.

An engine controller 122 comprehensively controls an image formation operation of the printer. Further, the engine controller 122 incorporates an application specific integrated circuit (ASIC) 1221, a central processing unit (CPU) 1222, a random access memory (RAM) 1223, and an electrically erasable programmable read-only memory (EEPROM) 1224. The ASIC 1221 performs control of APC operation of the laser driving system circuit 130 described below or rotational driving of the scanner motor 120, and further, performs communicate control with the video controller 123. The CPU 1222 instructs control start or stop to the ASIC 1221. The RAM 1223 and the EEPROM 1224 store programs or processing results executed by the CPU 1222, and setting values set to the ASIC 1221.

An Ldrv signal of the engine controller 122 and a VIDEO signal from the video controller 123 are connected to an input of an OR circuit 124, and an output signal Data is connected to the switching circuit 106 described below. The VIDEO signal is generated based on print data sent from external devices such as reader scanners, or host computers externally connected.

The VIDEO signal output from the video controller 123 is input into a buffer 125 with an enable terminal, and an output of the buffer 125 is connected to the OR circuit 124 described above while the enable terminal is connected to Venb signal from the engine controller 122. Further, the engine controller 122 is connected in order to output a SH1 signal, a SH2 signal, a Base signal, a Ldrv signal, and a Venb signal described below. A first reference voltage Vref11, and a second reference voltage Vref21 are input into positive polarity terminals of the comparator circuits 111 and 101, respectively; and outputs from the comparator circuits 111 and 101 are input into the sample and hold circuits 112 and 102, respectively. The hold capacitors 113, 103 are connected to the sample and hold circuits 112, 102, respectively. The reference voltage Vref11 is set as a target voltage of a light emission level (second light emission intensity) for weak light emission. Further, the reference voltage Vref21 is set as a target voltage of a light emission level for normal printing (second light emission level).

Outputs of the hold capacitors 113, 103 are input into positive polarity terminals of the current amplifier circuits 114 and 104 through the sample and hold circuits 112 and 102, respectively. The reference current sources 115, 105 are connected to the current amplifier circuits 114, 104, respectively; and outputs of the current amplifier circuits 114 and 104 are input into the switching circuits 116 and 106, respectively. A third reference voltage Vref12, and a fourth reference voltage Vref22 are input into negative polarity terminals of the current amplifier circuits 114, 104, respectively. Electric currents Io1, Io2 are determined according to differences between output voltages of the sample and hold circuits 112, 102 described previously, and the reference voltage Vref12 and the reference voltage Vref22. In other words, the Vref12 and Vref22 are voltage settings for determining electric currents.

The switching circuit 116 performs on/off operations based on (in response to) input of the "Base" signal. The switching circuit 106 performs on/off operations based on (in response to) the pulse modulation data signal Data. Output terminals of the switching circuits 116, 106 are connected to a cathode of the LD 107, and to supply driving currents Ib, Idrv. An anode of the LD 107 is connected to a power source Vcc. A cathode of the PD 108 which monitors light amount of the LD 107 is connected to the power source Vcc, and an anode of the PD 108 is connected to the current-voltage conversion circuit 109 and a monitor current Im is caused to flow through the current-voltage conversion circuit 109, thereby generating a monitor voltage Vm. The monitor voltage Vm is input as negative feedback into negative polarity terminals of the comparators 111, 101.

In FIG. 3, although the engine controller 122 and the video controller 123 are illustrated separately, it is not limited to this form. For example, a part or the whole of the engine controller 122 and the video controller 123 may be built by the same controller. Further, a part or the whole of the laser driving circuit surrounded with the dotted line frame in FIG. 3 may be incorporated into, for example, the engine controller 122.

[APC Operation]

Hereinbelow, operations of the APC for weak light emission and the APC for printing light emission with regard to two levels of light emission (two light emission levels) of the light-emitting element executed in the laser driving system circuit 130 will be described.

In the APC for weak light emission, the driving current Ib is adjusted so that the laser diode 107 emits light at the light emission level (second light emission intensity) for weak light emission. Further, in the APC for printing light emission, the driving current Idrv is adjusted so that the laser diode 107 emits light with the light emission level (second light emission intensity) for normal printing.

First, operation of the APC for weak light emission (second adjustment step) will be described. In operation of the APC for weak light emission, the ASIC 1221 sets the sample and hold circuit 102 to the hold state (during non-sampling period) by the SH1 signal, and sets the switching circuit 106 to off-operation state by the input signal Data. Regarding the input signal Data, the ASIC 1221 puts the Venb signal connected to an enable terminal of the buffer 125 provided with the enable terminal into the disable state, controls the Ldrv signal, and puts the input signal Data to an off-state. Furthermore, the ASIC 1221 sets the sample and hold circuit 112 to the sampling state by the SH2 signal, and sets the switching circuit 116 to on-operation state by the input signal Base. A time period during which the sample and hold circuit 112 is in the sampling state is equivalent to a time period during which the light emission level for weak light emission is automatically adjusted. During this time period, driving current Ib is supplied to the LD 107. When the LD 107 emits light in this state, the PD 108 monitors a light emission amount (light emission intensity) of the LD 107, and generates a monitor current Im1 directly proportional to the light-emitting amount (light emission intensity). By causing the monitor current Im1 to flow through the current-voltage conversion circuit 109, the monitor voltage Vm1 is generated. Further, the current/voltage amplifier circuit 114 adjusts the driving current (second driving current) Ib based on Io1 flowing through the reference current source 115 so that the monitor voltage Vm1 coincides with the first reference voltage Vref11 which is a target value.

At the time of execution of the APC for printing light emission and at the time of normal image formation (time during which image signal is being sent), the sample and hold circuit 112 is in the hold state, and a light emission level for weak light emission is maintained.

In order to prevent occurrence of fogs/reverse fogs of toners, it is necessary always to make a light amount of Pb stable during image formation.

Next, operation of the APC for printing light emission (first adjustment step) will be described. In the operation of the APC for printing light emission, the ASIC 1221 sets the sample and hold circuit 112 to the hold state (during non-sampling period) by the SH2 signal, and sets the switching circuit 116 to on-operation state by the input signal Base. Accordingly, the driving current Ib is supplied to the LD 107. Furthermore, the ASIC 1221 sets the sample and hold circuit 102 to the sampling state by the SH1 signal, and puts the switching circuit 106 on-operation state by the input signal Data. More specifically, at that time, the ASIC 1221 controls Ldrv signal, and sets the input signal Data such that the LD 107 goes into light emission state. A time period during which the sample and hold circuit 112 is in the sampling state is equivalent to a time period during which the light emission level for weak light emission is automatically adjusted. During this time period, Ib+Idrv obtained by superimposing the driving current Idrv on Ib is supplied the LD 107. When the LD 107 emits light in this state, the PD 108 monitors a light emission amount of the LD 107, and generates a monitor current Im2 (Im2>Im1) directly proportional to the light emission amount. By causing the monitor current Im2 to flow through the current-voltage conversion circuit 109, the monitor voltage Vm2 is generated. Further, the current/voltage amplifier circuit 114 adjusts the driving current (first driving current) Id based on Io2 flowing through the reference current source 105 so that the monitor voltage Vm2 coincides with the second reference voltage Vref21 which is a target value.

A the time of normal image formation, the sample and hold circuit 102 is in the hold state, and the switching circuit 106 performs on/off operation depending on the input signal data Data, and yields pulse width modulation to the driving current Idrv.

Figure 4:
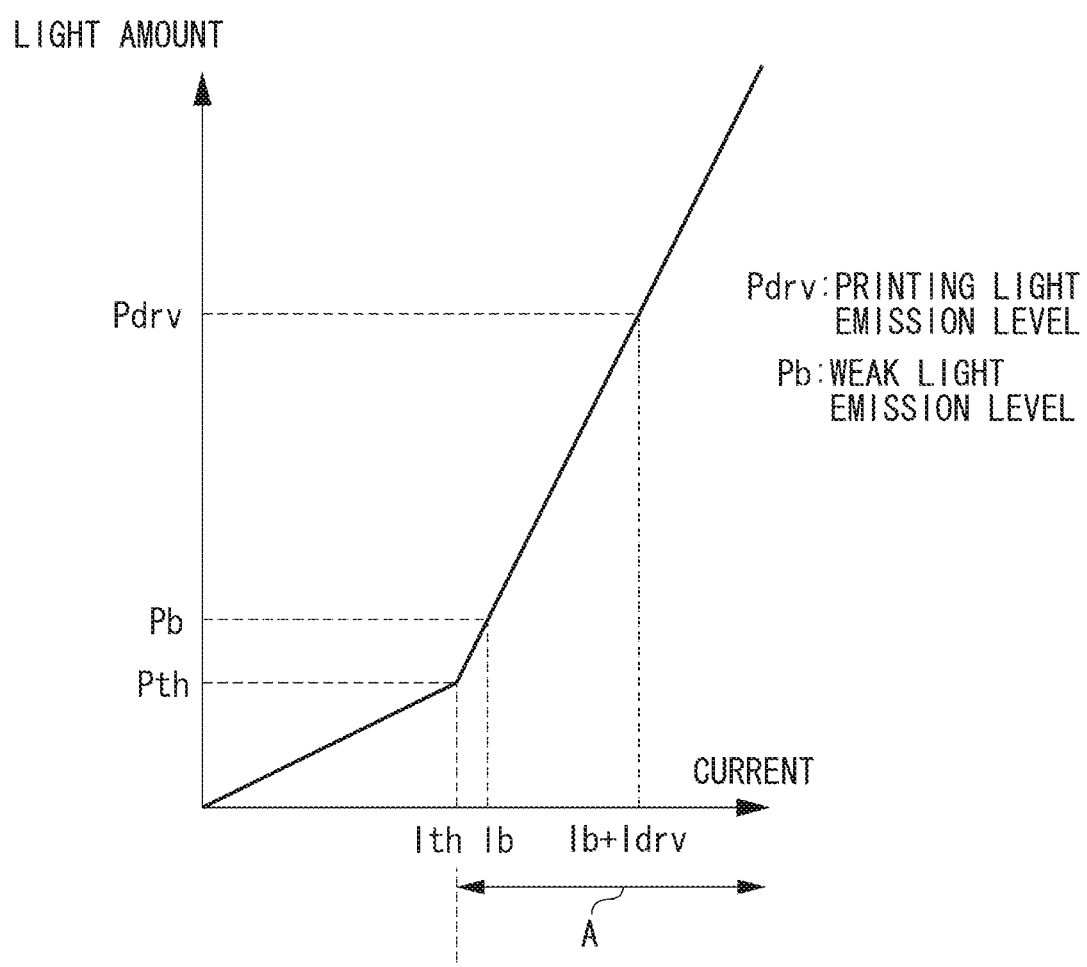
FIG. 4 is a graph illustrating a relationship between electric current flowing through a laser diode and light emission intensity.

FIG. 4 is a graph illustrating a relationship between current flowing through the LD 107 and light amount. The weak light emission for non-image portion is set such that the driving current Ib exceeds a threshold value current Ith of the LD 107, and the weak light emission level Pb is reached. The weak light emission level (second light emission intensity) means a light amount level at which developer such as toner is not substantially charged and does not adhere (is not visualized) to the photosensitive drum even by that laser irradiation level, and a light amount level at which toner fogs state is good. Further, the weak light emission level Pb is supposed to be a region (A in FIG. 4) where Ith is exceeded. If a weak light emission level Pb at that time falls within a region less than Ith, spectral wavelength distribution is widened, resulting in a wider wavelength distribution than a rated wavelength of the laser beam. Consequently, sensitivity of the photosensitive drum is disturbed, and surface potential becomes unstable. Therefore, the weak light emission level Pb is desirably set in a region where Ith is exceeded.

On the other hand, at the time of normal image formation, the driving current Ib+Idrv is set to attain a light emission level which allows a light amount of the printing light emission level Pdrv. The printing light emission level (first light emission intensity) means a light amount level at which charging and adherence (visualization) of developer (toner) to the photosensitive drum enters into a saturated state.

Figure 5:
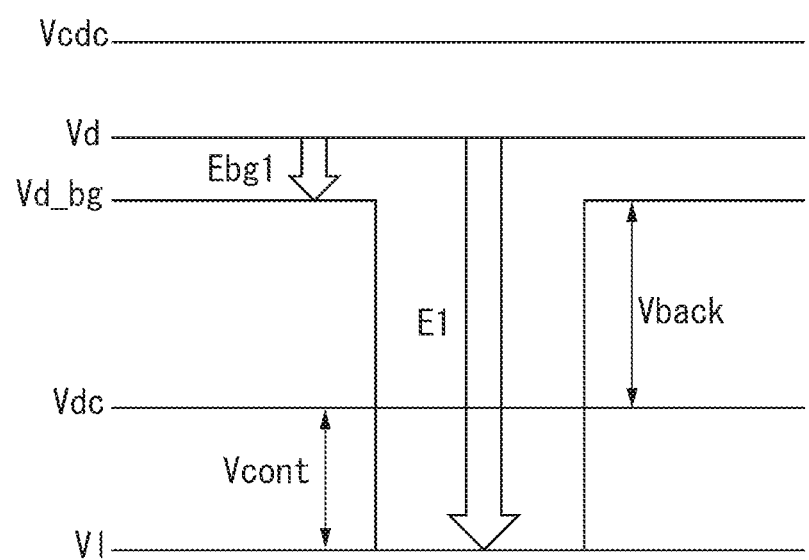
FIG. 5 is a diagram illustrating change in electric potential of a photosensitive drum involved in weak light emission.

FIG. 5 is a diagram for illustrating the weak light emission level described above in greater detail. A charging voltage Vcdc applied from a charging high-voltage power source (not illustrated) via a primary charging roller 7 to the photosensitive drum 5 appears as the charging potential Vd on the surface of the photosensitive drum 5. At that time, Vd is set to a potential higher than the charging potential of the non-image portion at the time of toner development. Then, the charging potential Vd is attenuated down to the charging potential Vd_bg by laser light emission of the weak light emission level Ebg1. This is because after the charging voltage Vcdc has been applied, a potential higher than a convergent potential may be generated in spots on the photosensitive member surface, which will increase a back-contrast Vback. The back-contrast Vback is a contrast of the developing potential Vdc and the charging potential Vd, and will induce reverse fogs.

On the other hand, when the charging potential Vd is attenuated down to a charging potential Vd_bg by the laser-induced light emission of the above-described weak light emission level Ebg1, chances where a potential higher than such convergent potential remains are lessened, and at least reverse fogs are inhibited. Further, it is well known that a transfer memory appears in Vd. However, the transfer memory can be reduced by the laser light emission of the above-described weak light emission level Ebg1, and occurrence of ghost images attributable to the transfer memory can be at least inhibited.

Further, the laser light emission at the above-described weak light emission level Ebg1 bears the function of making the back contrast Vback proper. From this viewpoint as well, occurrence of positive fogs of toners can be inhibited. Further, a development contrast Vcont (=Vdc−V1) which is a difference value between the developing potential Vdc and the exposing potential V1 can be also made proper at the same time. Accordingly, reduction of development efficiency, or occurrence of sweeping-up can be suppressed, and margin of transfer/retransfer can be secured.

Further, the charging voltage Vcdc can be set variably depending on environment or degradation (usage status) of the photosensitive drum or the like. Accordingly, a light amount at a targeted weak light emission level is set variably. For example, when a value of Vdcd becomes larger, and a light amount of the weak light emission level Ebg1 also becomes larger. On the other hand, when a value of the Vdcd becomes smaller, a light amount at the weak light emission level Ebg1 also becomes smaller.

Specifically, the charging potential Vd is desirably set to −700V to −600V, the charging potential Vd_bg to −550V to −400V, the developing potential Vdc to −350V, and the exposing potential V1 to −150V.

When the LD 107 is caused to emit light at a light emission level Pdrv for normal printing, the circuit of FIG. 3 operates as follows. More specifically, the sample and hold circuit 112 is set to the hold period, and the switching circuit 116 is put into on-operation, the sample and hold circuit 102 is set to the hold period, and the switching circuit 106 is put into on-operation. Accordingly, the driving current Ib+Idrv is supplied to the LD 107. Further, the weak light emission level Pb of the driving current Ib can be attained in an off-state of the switching circuit 106.

The printing light emission level Pdrv becomes a light emission amount obtained by superimposing the driving current Idrv corresponding to the PWM light emission level by the pulse width modulation, on the driving current Ib corresponding to the weak light emission level Pb. More specifically, the SH2, SH1, and Base signals are in the above-described setting states, and the engine controller 122 puts the Venb signal into an enable state, and causes the switching circuit 106 to perform on/off operation using the Data signal according to the VIDEO signal. Accordingly, light emissions in light-emitting states at two levels: between Ib and Ib+Idrv in terms of the driving current, that is, between the Pb and Pdrv in terms of light amount level become possible. Furthermore, in a light amount of Pdrv, light emission is performed at a time which follows a pulse duty on the basis of Pb.

By operating the laser driving system circuit 130 in this way, it becomes possible to cause the LD 107 to perform APC at the weak light emission level, and to emit light at the weak light emission level Pb which is a second light emission level in the laser light emission region. Further, by using the Data signal by the VIDEO signal sent out from the video controller 123, it becomes possible to perform light emission at the printing light emission level Pdrv which is a second level in the laser light-emitting region, and it becomes possible to have the light emission levels of two levels.

[Issues Regarding Startup of Optical Scanning Device 9]

Next, issues regarding startup of the optical scanning device (laser scanner) 9 will be described. When starting up the laser scanner, the scanner motor is accelerated to control (boots) the scanner motor such that a rotational speed of the scanner motor becomes a speed (target speed Vtg) for performing image formation. At that time, in order to detect the rotational speed of the scanner motor, the laser scanner forcedly causes the laser diode 107 to emit light, detects laser beams with the BD detecting element 121, generates a BD signal, and monitors a cycle of the BD signal calculated based on the generated BD signal. In other words, there is a correlation such that the faster the rotational speed of the scanner motor, the shorter the cycle of the BD signal. Therefore, the laser scanner can obtain a value related to the rotational speed of the scanner motor from the cycle of the BD signal, and can determine whether the rotational speed of the scanner motor has converged on the target speed Vtg. Then, after it is determined that the rotational speed of the scanner motor has converged on the target speed Vtg (the scanner motor has been boosted), the image forming apparatus starts image formation operation.

Since the cycle of the BD signal is monitored when the scanner motor is booted, the laser diode 107 is forcedly caused to emit light, but if the laser diode 107 emits light at a weak light emission level Pb, a light amount becomes low. As a result, it is difficult to detect the laser beam using the BD detecting element 121. Therefore, when the cycle of the BD signal is monitored, the laser diode 107 desirably emits laser beam normally at a light emission level Pdrv. In other words, the laser scanner monitors the cycle of the BD signal while performing operation of the APC for printing light emission when booting the scanner motor, and after the rotational speed of the scanner motor has converged on the target speed Vtg, the APC for weak light emission is performed for the purpose of image formation, and further an operation of the second APC for printing light emission is performed.

This will be described in detail. FIGS. 18A to 18C are diagrams illustrating temporal changes of laser light amounts, driving currents, and operation modes by the APC execution at the time of startup of the laser scanner. In FIGS. 18A to 18C, FIG. 18A illustrates operation modes, FIG. 18B driving currents to be supplied to the light-emitting element, FIG. 18C light amounts of the light-emitting element.

First, in order to boot the scanner motor, the laser scanner adjusts the driving current Idrv to emit the laser beam at the printing light emission level Pdrv, by executing the APC for printing light emission.

The APC for printing light emission, originally, is carried out in a state where driving current is supplied to the light-emitting element on the basis of Ib, and is set to adjust Idrv for superposition so that the light amount level becomes equal to Pdrv. However, at that time, since the APC for weak light emission is not executed, Idrv will be adjusted in a state where Ib is not supplied to the light-emitting element (Ib=0). In a state where Ib is not thus supplied to the element, when Idrv is adjusted so that a light amount level of the light-emitting element (the LD 107) becomes Pdrv, a value of Idrv will become Idrv2. Consequently, at that time point, adjustment of the value of Idrv is not completed.

Next, after the rotational speed of the scanner motor has converged on the target speed Vtg, a driving current Ib is adjusted to emit laser beam at the weak light emission level Pb, by executing the APC for weak light emission. The APC for weak light emission adjusts Ib in a state where only Ib is supplied to the light-emitting element so that the light amount level becomes equal to Pb. Therefore, a value of adjusted Ib becomes Ib1.

After that, the second APC for printing light emission is executed in order to complete adjustment of the value of Idrv. Immediately after the execution of the second AFC, the laser scanner enters into a state where Ib1+Idrv2 in which Idrv2 is added for superposition based on Ib1 is supplied to the light-emitting element (the LD 107). Ib1+Idrv2 at that time is larger than a desired value, and the light amount level is higher than Pdrv, and in an overshoot state. Consequently, a value of Idrv is adjusted to decrease down to Idrv1 which makes the light amount level of the light-emitting element (the LD 107) become equal to Pdrv. Thus, Ib and Idrv are adjusted to a desired value, and thus light amounts of two levels can be obtained. As a matter of course, a relationship of Idrv1+Ib=Idrv2 is satisfied.

When the APC for printing light emission is first executed in this way, the second APC for printing light emission may need to be executed, and in that case, an overshoot of driving current will occur at the time of the second APC for printing light emission. However, it is desired to reduce the overshoot as far as possible from viewpoint of rating of the laser diode.

Further, after the rotational speed of the scanner motor has converged on the target speed Vtg, the APC for weak light emission, and the second APC for printing light emission must be performed, accordingly start of image formation operation is delayed by the length of the second APC.

By performing the APC for the second printing light emission after the rotational speed of the scanner motor has converged on the target speed Vtg, a light emission time of the laser diode 107 increases by the length of the second printing light emission, and it is not efficient also from viewpoint of service life of the laser diode 107.

As described above, if only the APC for printing light emission is performed at the time of startup of the laser scanner (at the time of booting of the scanner motor), the driving current overshoot takes place.

[Startup Sequence of Laser Scanner]

In the present exemplary embodiment, the APC operation at the time of startup of the laser scanner is improved. Hereinbelow, an operation at the time of startup of the laser scanner (at the time of startup of the laser driving system circuit 130) will be described.

Figure 6:
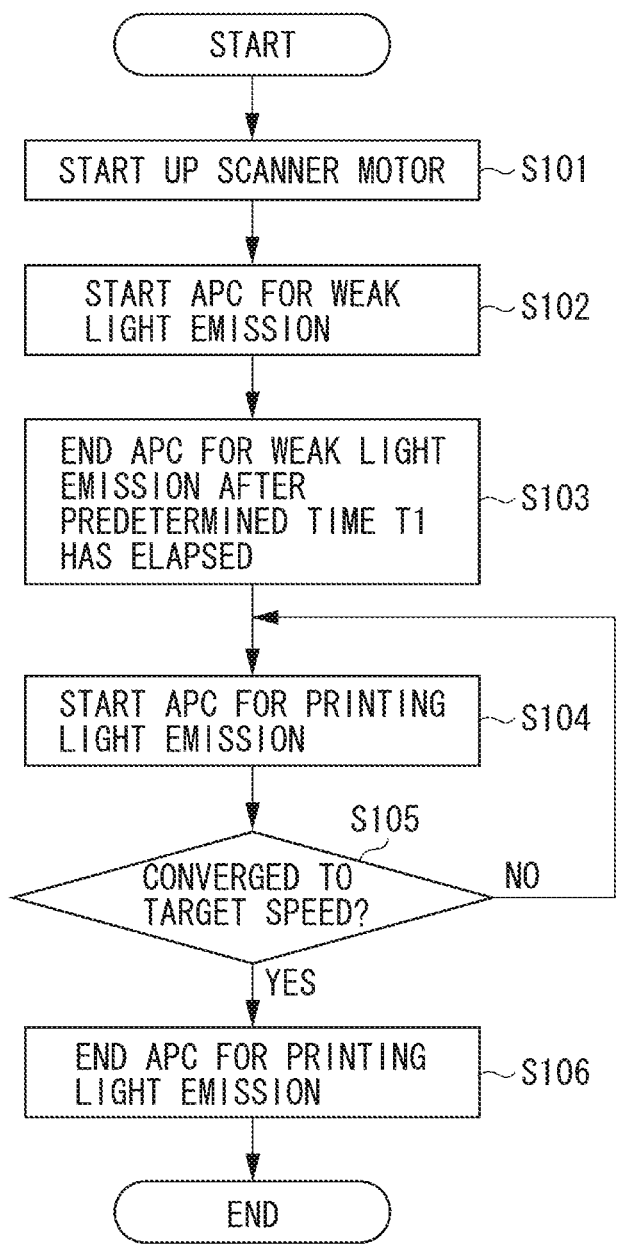
FIG. 6 is a flowchart illustrating startup sequence of a laser scanner.

In the present exemplary embodiment, the APC for weak light emission is firstly executed, and the APC for printing light emission is secondly executed. FIG. 6 is a flowchart illustrating startup sequence of the laser scanner. The processing is executed by the CPU 1222. First, the CPU 1222 communicates with the ASIC 1221, and in step S101, instructs the scanner motor 120 to start up (to start rotating and accelerate). Accordingly, the scanner motor 120 starts rotating and accelerates. In step S102, the CPU 1222 instructs the scanner motor 120 to start the weak light emission APC. Next, in step S103, the CPU 1222 continues the weak light emission APC until a predetermined time T1 has elapsed, and after the predetermined time T1 has elapsed, puts the sample and hold circuit 112 into a hold state to end the APC for weak light emission. The predetermined time T1 is shorter than a predicted time that the rotational speed V of the scanner motor 120 becomes equal to or greater than the target speed Vtgt. The time T1 is set to a sufficient time to complete a light amount adjustment at the weak light emission level by the weak light emission APC. Specifically, characteristics of the laser beam estimated from an operational environment or service life of the printer are taken into consideration to set the predetermined time T1 which is longer than a time necessary to complete an adjustment to the driving current Ib. For example, since the laser beam has characteristic that a threshold value current Ith (see FIG. 4) becomes larger owing to rise of temperature or degradation, it is only necessary to consider that a value of the driving current Ib corresponding to the weak light emission level Pb becomes also larger.

In the present exemplary embodiment, the predicted time that a speed becomes equal to or greater than 80% of the target speed Vtgt is set to T1. If such a setting is made in the present exemplary embodiment, regardless of environment, enough time to complete light amount adjustment at the weak light emission level can be obtained in the weak light emission APC.

Next in step S104, the CPU 1222 instructs start of the APC for printing light emission. During execution of the APC for printing light emission, the cycle of the BD signal can be detected. Therefore, simultaneously with the start of the APC for printing light emission, the ASIC 1221 performs control (converge control) to send acceleration signal (ACC) and/or deceleration signal (DEC) to the scanner motor 120, based on the detected cycle of the BD signal so that the rotational speed V of the scanner motor 120 converges on the target speed Vtgt. On the other hand, in step S105, the CPU 1222 monitors a rotational speed V of the scanner motor 120 which the ASIC 1221 calculates, and determines whether the rotational speed V has converged on the target speed Vtgt, at a certain time interval of a round robin type, for example. To determine whether the rotational speed V has converged on the target speed Vtgt, for example, a known method for making a determination on whether the rotational speed V of the scanner motor 120 falls within a plus/minus several percents of the target speed Vtg for a predetermined time or longer. If the CPU 1222 determines that the rotational speed V has not converged on the target speed Vtgt, the CPU 1222 continues to monitor the rotational speed V. On the other hand, in step S106, if the CPU 1222 determines that the rotational speed V has converged on the target speed Vtgt, the CPU 1222 instructs end of the APC for printing light emission, and ends the startup sequence. When the startup sequence ends, image formation operation is executed. In other words, the engine controller 122 receives image data from the video controller 123 and performs exposure operation on the photosensitive drum 5 by the LD 107.

FIG. 7 (including 7A to 7E) each is a diagram illustrating temporal change of 11A operation mode, of 7B laser beam driving current, of 7C laser beam light amount, of 7D BD signal, and of 7E scanner motor rotational speed, in the processing of the startup sequence of FIG. 6. In FIGS. 7A, 7B, and 7C, the driving current Ib corresponding to the weak light emission level Pb is adjusted by executing the APC for weak light emission, and the driving current Ib+Idrv corresponding to printing light emission level (normal light emission level) Pdrv is adjusted by executing the next APC for printing light emission. In this way, by executing the APC in the order of the APC for weak light emission and the APC for printing light emission, while the scanner motor is being booted, Idrv can be adjusted to a desired value by the first APC for printing light emission, and occurrence of overshoot can be inhibited, and thus it becomes possible to efficiently adjust Ib and Idrv.

Further, in FIGS. 7A, 7D, and 7E, along with the scanner motor startup, the polygon mirror 133 begins to rotate according to acceleration instruction which the ASIC 1221 outputs. Although the LD 107 starts light emission at the same time by executing the APC for weak light emission, and a laser beam reflected by the polygon mirror 133 is input into the BD element 121, since the LD 107 emits light at the weak light emission level Pb in a weak light amount state, the BD element 121 does not detect the laser beam. Therefore, the BD signal is not generated, and the ASIC 1221 outputs acceleration instruction, and raises the rotational speed of the scanner motor. Since the LD 107 emits light at normal light emission level by executing the next APC for printing light emission, the BD element 121 detects the laser beam, and generates the BD signal. The ASIC 1221 inputs the generated BD signal, and calculates a cycle of the BD signal based on the BD signal. The CPU 1222 monitors the cycle of the BD signal as the rotational speed of the scanner motor, and determines whether the rotational speed has reached the target speed Vtgt.

As described above, in the present exemplary embodiment, the laser scanner has been started up while the APC for printing light emission is executed firstly, and the APC for weak light emission is executed secondly. In other words, the laser scanner has executed the APC for weak light emission, after the scanner motor 120 started rotating and before performing the APC for printing light emission. By doing so, although the LD 107 emits light in the light-emitting state at two levels of the weak light emission level Pb, and the printing light emission level Pdrv, overshoot of the driving current can be inhibited at the time of the second APC for printing light emission while emitting light at the normal light emission level Pdrv to boot the scanner motor. Therefore, it becomes possible to efficiently adjust Ib and Idrv. In other words, it becomes possible to appropriately adjust Ib and Idrv so that one light-emitting element emits light at two light emission intensities.

Next, a second exemplary embodiment will be described. The second exemplary embodiment is the same as the first exemplary embodiment except for a part of the startup sequence of the laser scanner. In other words, in the second exemplary embodiment, the startup sequence of repeatedly performing the APC for first weak light emission and the APC for printing light emission will be described. Since other configurations of image forming apparatuses, the configuration of the optical scanning device 9, the configuration of the laser driving system circuit 130 are similar to those in the first exemplary embodiment, descriptions thereof will not be repeated, and only difference from the first exemplary embodiment will be described.

In the first exemplary embodiment, startup sequence of performing the APC for weak light emission and the APC for printing light emission one time respectively at the time of the laser scanner startup before the rotational speed of the scanner motor reaches the target speed, has been described. Since the laser driving system circuit 130 is constituted of an analog circuit, the driving current Ib which is in the hold state while execution the APC for printing light emission is in progress gradually decreases due to a leak current. Thus, in the present exemplary embodiment, the startup sequence for more accurately adjusting the driving current Ib will be described.

Figure 8:
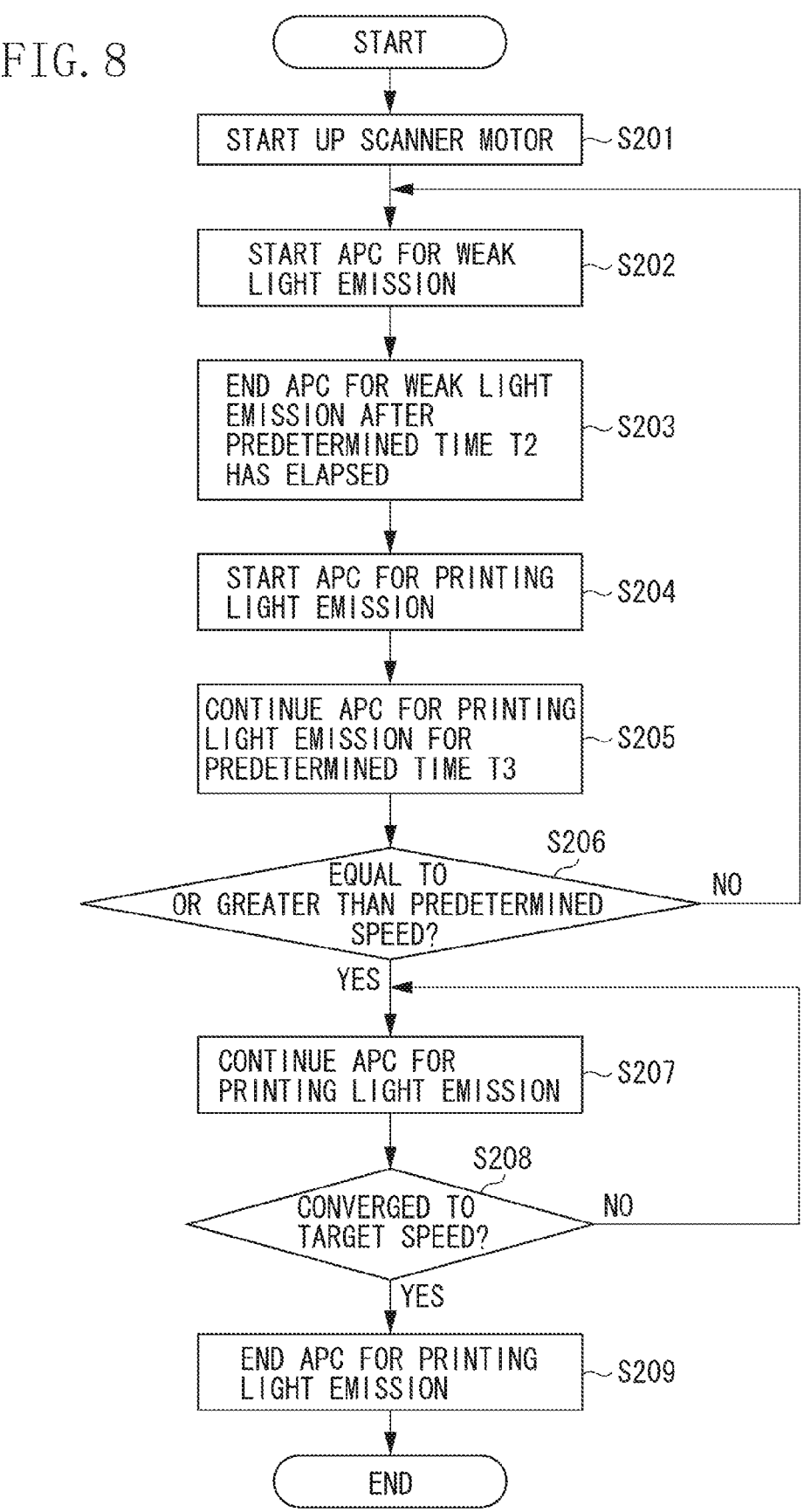
FIG. 8 is a flowchart illustrating the startup sequence of the laser scanner.

FIG. 8 is a flowchart illustrating the startup sequence of the laser scanner according to the present exemplary embodiment. The processing is executed by the CPU 1222. In steps S201 to S204, the processing similar to those in step S101 to in step S104 is performed which have been described in the first exemplary embodiment. In other words, first, the APC for weak light emission is executed. The predetermined time T2 in step S203 may be the predetermined time T1 in step S103. In step S205, the CPU 1222 continues the APC for printing light emission, until a predetermined time T3 has elapsed. The predetermined time T3 is a time enough for the ASIC 1221 to calculate the cycle of the BD signal. In other words, the predetermined time T3 is a time during which at least successively two or more BD signals can be detected when executing the APC for printing light emission.

Next in step S206, the CPU 1222 determines whether the rotational speed of the scanner motor is equal to or greater than the predetermined speed Vint, based on a value (cycle of the BD signal) corresponding to the rotational speed of the scanner motor calculated by the ASIC 1221. If the rotational speed is slower than the predetermined speed Vint, the processing returns to step S202, and again instructs start of the APC for weak light emission. On the other hand, if the rotational speed is equal to or greater than the predetermined speed Vint, the processing proceeds to step S207, and the CPU 1222 continues the APC for printing light emission. Further, at the same time, similarly to the first exemplary embodiment, the ASIC 1221 executes converge control for causing the rotational speed V of the scanner motor 120 to converge on the target speed Vtgt. The CPU 1222 ends the startup sequence after having performed the processing in steps S208 and S209 similar to those in steps S105 and S106 in the first exemplary embodiment. The predetermined speed Vint is a speed lower than the target speed Vtgt of the scanner motor. Further, the predetermined speed Vint should be as close as possible to the target speed Vtgt, and it is desirable to set the predetermined speed Vint to a speed of 80 to 90% of the target speed Vtgt. The reason for that is that a repetitive time of executing the APC for weak light emission and the APC for printing light emission is to be taken as long as possible. However, if the predetermined speed Vint is set to a speed too close to the target speed Vtg, it is difficult to generate the BD signal while executing the APC for weak light emission is in progress, and the predetermined speed Vint will exceed significantly the target speed Vtgt while executing the APC for weak light emission is in progress. As a result, it may take much time to cause the speed of the scanner motor to converge on the target speed Vtgt. Therefore, while taking these into consideration, the predetermined speed Vint is set to a speed which is a predetermined percentage of the target speed Vtgt.

Figure 9A:
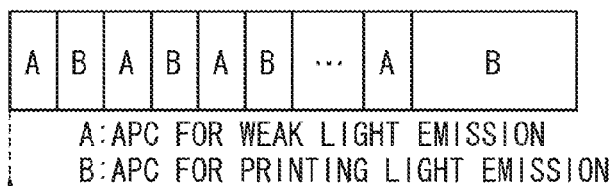
FIGS. 9A to 9E are diagrams illustrating temporal changes of laser driving current, laser light amount, BD signal, rotational speed of scanner motor, in the processing of startup sequence.
Figure 9B:
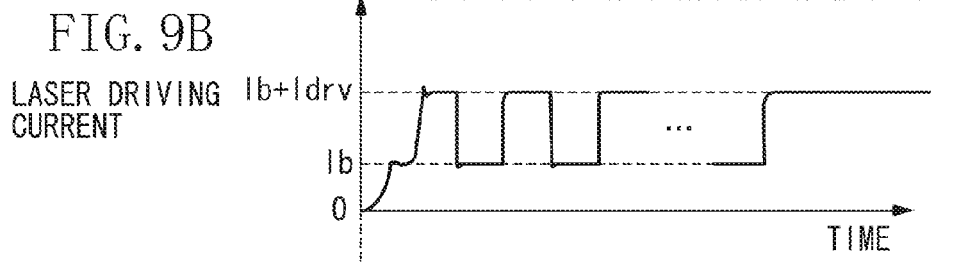
Figure 9C:
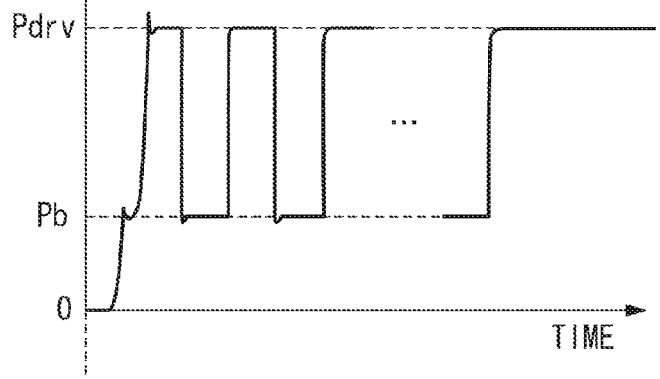
Figure 9D:
Figure 9E:
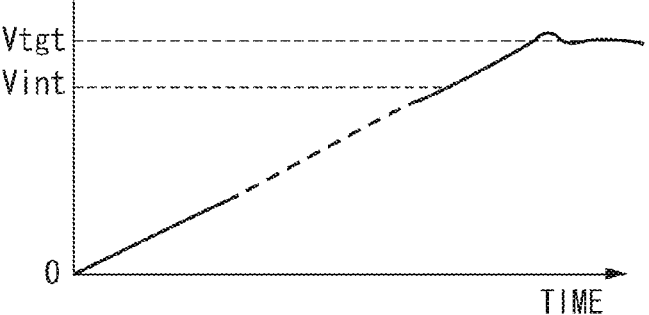

FIG. 9A is a diagram illustrating temporal change of operation modes, FIG. 9B temporal change of laser beam driving currents, FIG. 9C temporal change of laser beam light amounts, FIG. 9D temporal change of BD signals, and FIG. 9E temporal change of scanner motor rotational speeds, in processing of the startup sequence in FIG. 8.

In FIGS. 9A, 9B, and 9C, while repeatedly performing executing the APC for weak light emission and the APC for printing light emission, Ib and Idrv are adjusted. Furthermore, by repetitively performing executing the APC for weak light emission and the APC for printing light emission, the startup sequence can be completed in a state adjusted to a desired light amount, while inhibiting decrease in the driving current due to the leak current.

In FIGS. 9A, 9D, and 9E, the CPU 1222 determines whether the rotational speed V of the scanner motor 120 calculated by the ASIC 1221 is equal to or greater than the predetermined speed Vint, each time the APC for weak light emission and the APC for printing light emission are executed. Although the BD signal is generated by the BD element 121, while execution of the APC for printing light emission is in progress, in a time period until the predetermined speed Vint is reached, the acceleration state is maintained since the rotational speed V is equal to or less than the predetermined speed Vint. If it is determined that the rotational speed V is equal to or greater than the predetermined speed Vint, the operation is similar to that in the first exemplary embodiment.

As described above, in the present exemplary embodiment, the laser scanner has been started up to execute firstly the APC for weak light emission, and secondly execute the APC for printing light emission. In other words, the laser scanner executes the APC for weak light emission, after the scanner motor 120 has started rotating and before performing the APC for printing light emission. By doing so, although the LD 107 emits light in the light-emitting state at two levels of the weak light emission level Pb and the printing light emission level Pdrv, overshoot of the driving current can be inhibited at the time of the second APC for printing light emission while emitting light at the normal light emission level Pdrv to boot the scanner motor. Therefore, Ib and Idrv can be adjusted efficiently. In other words, it becomes possible to appropriately adjust Ib and Idrv so that one light-emitting element emits light at two light emission intensities.

In the present exemplary embodiment, at the startup of the laser scanner, by alternately repeating executions of the APC for weak light emission and the APC for printing light emission, it becomes possible to perform light amount adjustment at normal light emission level and weak light emission level more stably and more accurately than the first exemplary embodiment.

Next, in a third exemplary embodiment will be described. The third exemplary embodiment is the same as the first exemplary embodiment, except for a part of the startup sequence of the laser scanner. In other words, the startup sequence for repetitively performing executions of the APC for weak light emission and the APC for printing light emission with a non emitting period which the laser beam isn't emitted added will be described. Since other configurations of the image forming apparatus according to the present exemplary embodiment, and the configuration of the optical scanning device 9, and the configuration of the laser driving system circuit 130 are similar to those in the first exemplary embodiment, descriptions thereof will not be repeated, and only differences from the first exemplary embodiment will be described.

In the second exemplary embodiment, the startup sequence for repetitively executing the APC for weak light emission and the APC for printing light emission at the time of startup of the laser scanner has been described. In such a startup sequence, the laser beams are emitted constantly during the processing of the startup sequence. On the other hand, repeating laser irradiation on the photosensitive drum will lead to degradation of exposure sensitivity of the drum surface, and further to degradation of the laser diode. Consequently, constant light emission during the startup sequence will increase the frequency of laser irradiations on the photosensitive drum, and shorten service life of the photosensitive drum and/or the laser diode. Thus, in the present exemplary embodiment, the startup sequence for decreasing the frequency of the laser irradiation on the photosensitive drum, while performing stable and accurate light amount adjustment at normal light emission level and weak light emission level, will be described.

Figure 10:
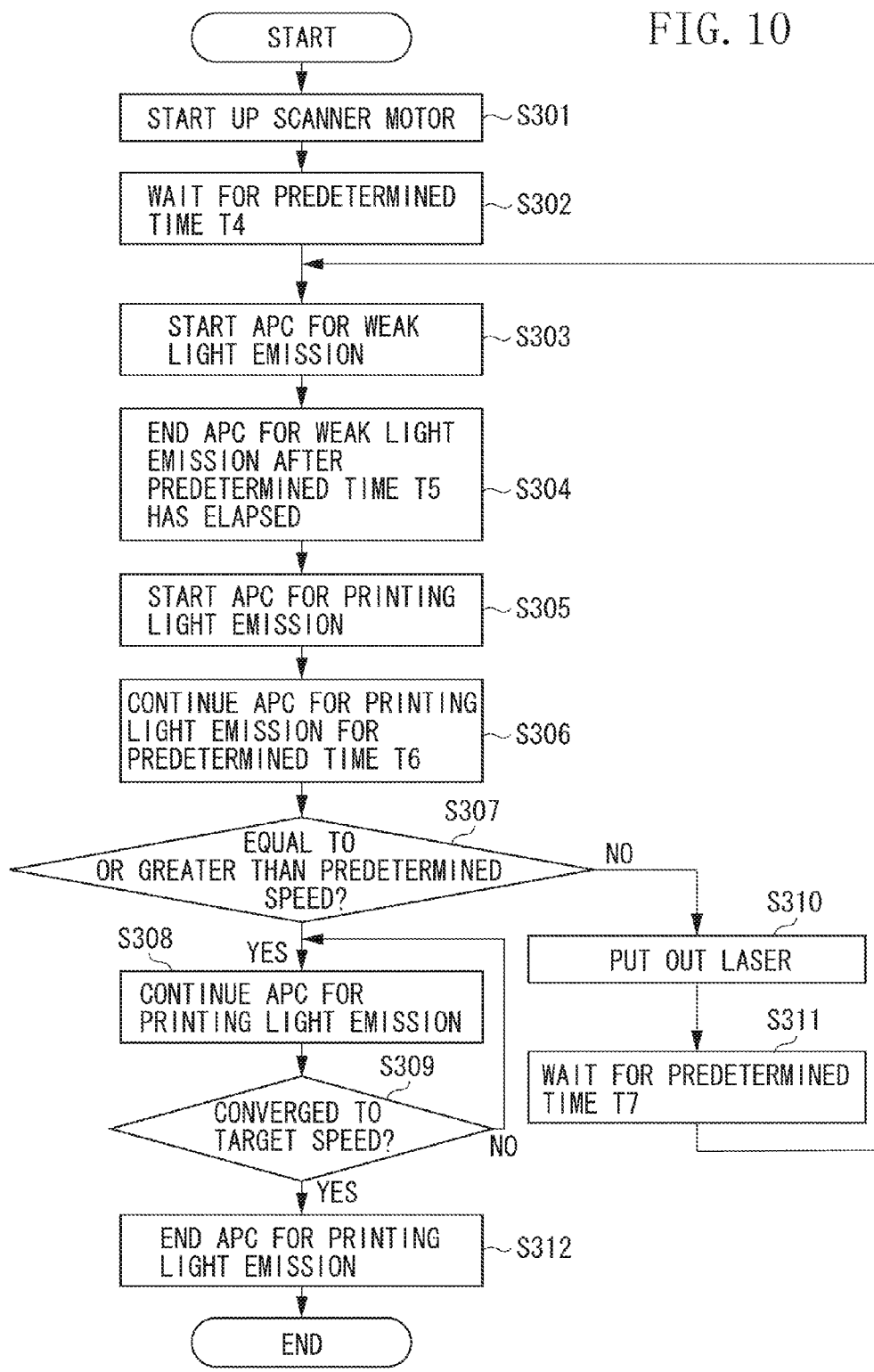
FIG. 10 is a flowchart illustrating the startup sequence of the laser scanner.

FIG. 10 is a flowchart illustrating the startup sequence of the laser scanner according to the present exemplary embodiment. The processing is executed by the CPU 1222. First, the CPU 1222 communicates with the ASIC 1221, and in step S301, the CPU 1222 starts up the scanner motor, and in step S302, waits for a predetermined time T4. At that time, the laser driving system circuit 130 is not operated, and the LD 107 is in a non emitting state. The predetermined time T4 may be set to any given time, as long as a time period excluding a time taken to execute the APC for weak light emission and the APC for printing light emission, and a time taken to monitor the rotational speed of the scanner motor is used, out of a time period until the scanner motor reaches the target speed. For example, a predicted time to reach a speed of ⅓ of the target speed may be set.

Next, in the processing in steps S303 to S306, the CPU 1222 performs the processing similar to those in steps S202 to S205 which have been described in the second exemplary embodiment. A predetermined time T5 in step S304 and a predetermined time T6 in step S306 may use a predetermined time T2 in step S203 and a predetermined time T3 in step S205, or may be set shorter than these times. Next in step S307, the CPU 1222 determines whether the rotational speed of the scanner motor has become equal to or greater than the predetermined speed Vint. If it is determined that the rotational speed of the scanner motor is slower than the predetermined speed (NO in step S307), the processing proceeds to step S310, the CPU 1222 ends the APC for printing light emission, and puts out the LD 107. In other words, in the laser driving system circuit 130 illustrated in FIG. 3, the CPU 1222 brings the sample and hold circuits 112, 102 into the hold state, and furthermore brings the switching circuits 116,106 into an off-state. Then, in step S311, the CPU 1222 waits until the predetermined time T7 has elapsed. The predetermined time T7 may be times similar to those in the processing in steps S304 and S306. When the predetermined time T7 has elapsed, the processing returns to step S303. On the other hand, in step S307, if it is determined that the rotational speed of the scanner motor is equal to or greater than the predetermined speed Vint (YES in step S307), the CPU 1222 continues the APC for printing light emission. Further, at the same time, similarly to the first exemplary embodiment, the ASIC 1221 executes convergence control for causing the rotational speed V of the scanner motor 120 to converge on the target speed Vtgt. On the other hand, the CPU 1222 performs the processing in steps S308, S309, and S312. Since the above processing are similar processing in steps S207 to step S209, descriptions thereof will not be repeated.

Figure 11A:
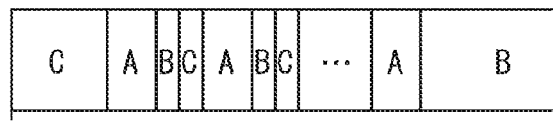
FIGS. 11A to 11E are diagrams illustrating temporal changes of laser driving current, laser light amount, BD signal, rotational speed of scanner motor, in the processing of startup sequence.
Figure 11B:
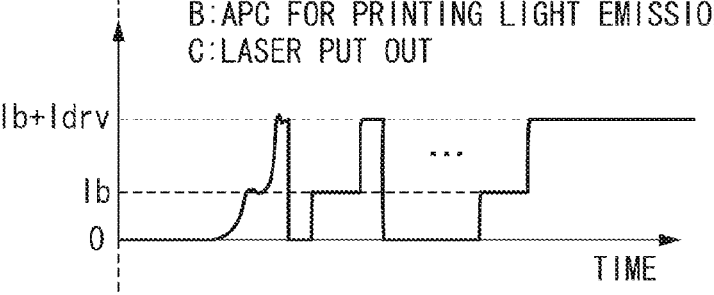
Figure 11C:
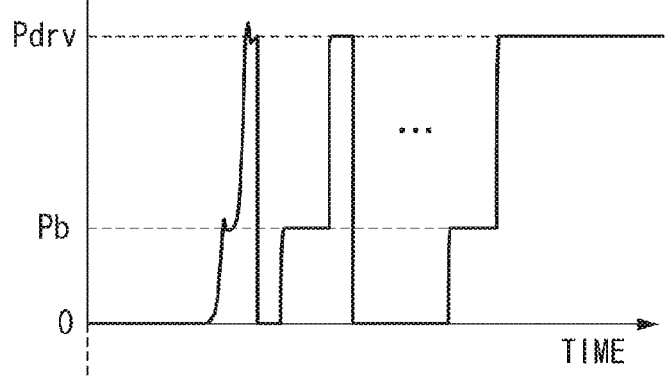
Figure 11D:
Figure 11E:
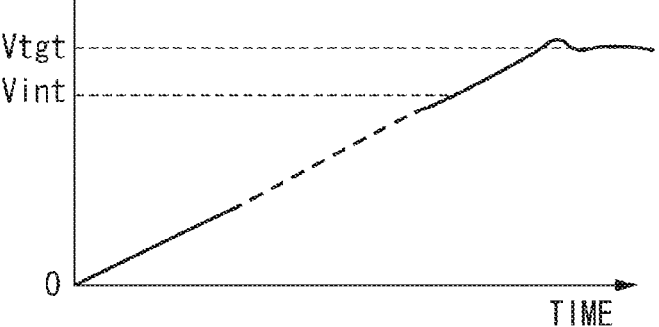

FIG. 11 (including FIGS. 11A to 11E) is a diagram illustrating temporal change of FIG. 11A operation modes, FIG. 11B temporal change of laser beam driving currents, FIG. 11C temporal change of laser beam light amounts, FIG. 11D temporal change of BD signals, and FIG. 11E temporal change of rotational speeds of the scanner motor, in the processing of the startup sequence in FIG. 10. In FIGS. 11A, 11B, and 11C, when the scanner motor is started up, execution of the APC for weak light emission is started, after the predetermined time T4 has elapsed in step S302. Thereafter, Ib and Idrv are adjusted while repetitively performing executions of the APC for weak light emission, the APC for printing light emission, and the non emitting state.

Further, in FIGS. 11A, 11D, and 11E, similarly to the second exemplary embodiment, each time the APC for weak light emission and the APC for printing light emission are executed (including the non emitting state at the second time and thereafter), the CPU 1222 determines whether the rotational speed V of the scanner motor 120 calculated by the ASIC 1221 is equal to or greater than the predetermined speed Vint. Although a time period until reaching Vint and a time period during which the laser beams are put out, exist, a time period of the APC for printing light emission is set enough to enable the ASIC 1221 to calculate the rotational speed of the scanner motor. Since operations after the rotational speed V of the scanner motor 120 has become equal to or greater than Vint are similar to those in the second exemplary embodiment, descriptions thereof will not be repeated.

As described above, in the present exemplary embodiment, the laser scanner has been started up to firstly execute the APC for weak light, and to secondly execute the APC for printing light emission. In other words, the laser scanner has executed the APC for weak light emission, after the scanner motor 120 starts rotating and before performing the APC for printing light emission. By doing so, although the LD 107 emits light in the light-emitting state at two levels of the weak light emission level Pb and the printing light emission level Pdrv, overshoot of the driving current can be inhibited at the time of the second APC for printing light emission while emitting light at the normal light emission level Pdrv to boot the scanner motor. Therefore, Ib and Idrv can be efficiently adjusted. In other words, it becomes possible to make an appropriate adjustment so that one light-emitting element emits light at two light emission intensities.

Further, in the present exemplary embodiment, by alternately repeating executions of the APC for weak light emission and the APC for printing light emission, at the time of startup of the laser scanner, it becomes possible to perform light amount adjustment at normal light emission level and weak light emission level more stably and more accurately than the first exemplary embodiment. Further, the frequency of the laser irradiation on the photosensitive drum can be decreased by providing a time period (the non emitting period) during which the laser beam isn't emitted before the scanner motor converges on the target speed while performing light amount adjustment at normal light emission level and weak light emission level stably and accurately. Accordingly, it becomes possible to extend service life of the photosensitive drum or the laser diode longer than in the second exemplary embodiment. In the above descriptions, a time period (predetermined time T4) is provided during which the laser beam isn't emitted in step S302 before the APC for weak light emission. However, instead of providing the time period (predetermined time T4) during which the laser beam isn't emitted in step S302, only a time period (predetermined time T7) during which the laser beam isn't emitted in steps S310 and S311 may be provided. On the contrary, if a time period (predetermined time T4) during which the laser beam isn't emitted in step S302 is provided, the time period (predetermined time T7) during which the laser beam isn't emitted in steps S310 and S311 may not be provided. Further, the time period (predetermined time T7) during which the laser beam isn't emitted in steps S310 and S311 may be provided only one time instead of two times.

At any rate, from when rotation of the scanner motor 120 is started until the rotational speed reaches Vint in step S307, it is only necessary to provide at least one time period (predetermined time T4, predetermined time T7) during which the laser beam isn't emitted. The similar effects to the above can be obtained also in this case.

Further, in the above descriptions, a time period during which the laser beam isn't emitted has been provided before the APC for weak light emission, but it is not limited to this. In other words, if a time period is provided during which the laser beam isn't emitted between the APC for weak light emission and the APC for printing light emission, or the APC for weak light emission and the APC for printing light emission is executed a plurality of times, a time period may be provided during which the laser beam isn't emitted after the APC for printing light emission and before the APC for weak light emission. The similar effects to the above can be obtained also in this case.

Next, a fourth exemplary embodiment will be described. In the above-described first to third exemplary embodiments, the startup sequence of the laser scanner in which the APC for weak light emission is firstly performed has been described. However, in the fourth exemplary embodiment, the startup sequence of the laser scanner in which the APC for printing light emission is firstly performed will be described. Since the configuration of the image forming apparatus, the optical scanning device 8, and the laser driving system circuit 130 according to the present exemplary embodiment are similar to those in the first exemplary embodiment, descriptions thereof will not be repeated. Only difference from the first exemplary embodiment will be described.

Figure 12:
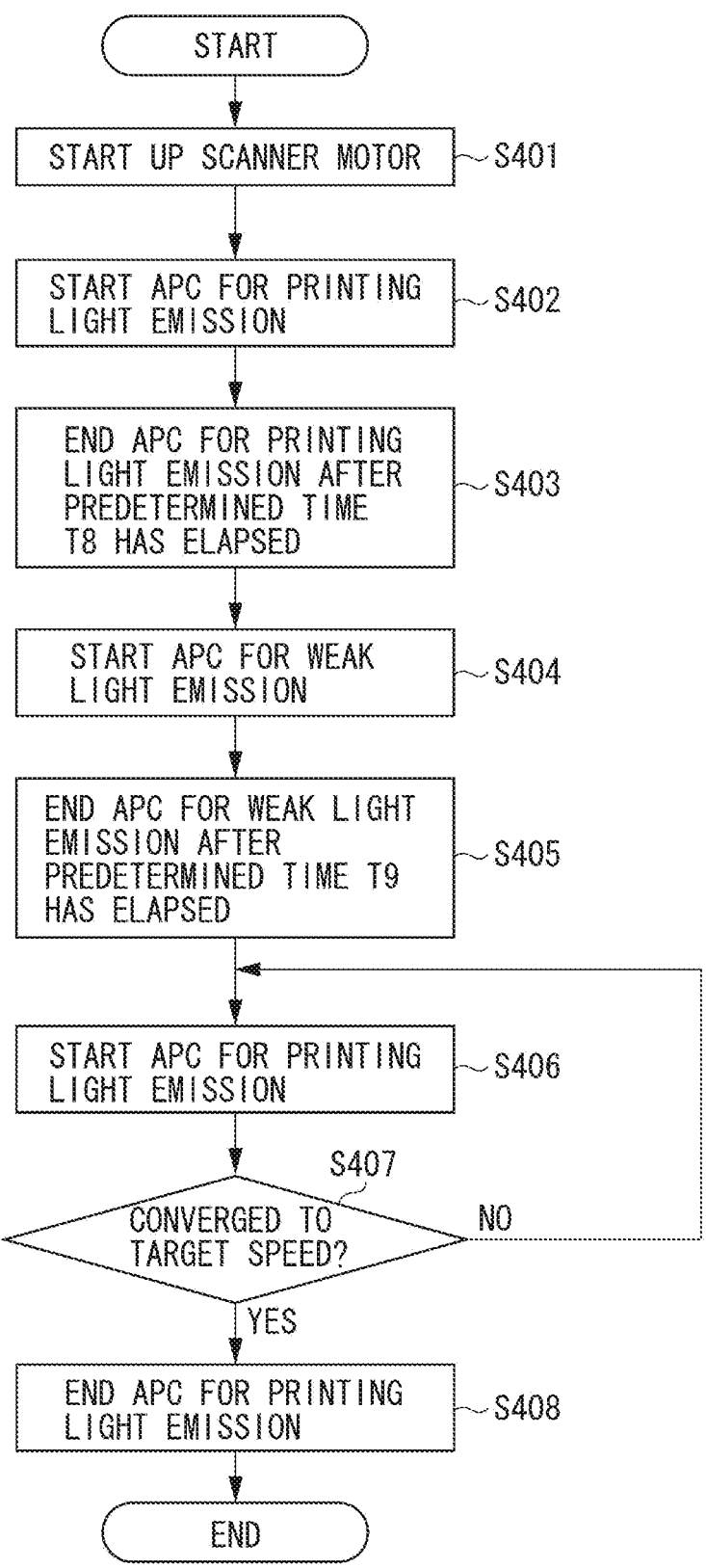
FIG. 12 is flowchart illustrating the startup sequence of the laser scanner.

FIG. 12 is a flowchart illustrating the startup sequence of the laser scanner according to the present exemplary embodiment. The processing is executed by the CPU 1222. First, in step S401, the CPU 1222 instructs startup of the scanner motor, and in step S402, instructs the laser driving system circuit 130 to start the APC for printing light emission. Next in step S403, the CPU 1222, when the APC for printing light emission is executed for a time period of the predetermined time T8, ends the APC for printing light emission. The predetermined time T8 will be described below. Thereafter, in step S404, the CPU 1222 starts the APC for weak light emission. Thereafter in steps S405 to step S407, the CPU 1222 performs the processing similar to those in steps S103 to S106 which have been described in the first exemplary embodiment. If the processing proceeds to step S406, the CPU 1222 continues the APC for printing light emission, and at the same time, the ASIC 1221 executes convergence control for causing the rotational speed V of the scanner motor 120 to converge on the target speed Vtgt, in a similar manner to the first exemplary embodiment.

[Descriptions of Predetermined Time T8]

FIG. 13 is a graph illustrating a relationship between driving current flowing through the LD 107 and light amount, to explain the predetermined time T8 in the processing in step S403 described above. As explained in the above-described [Issue On Startup Of The Laser Scanner], in characteristics represented by a solid line in FIG. 13, if execution of the APC for printing light emission is performed from the beginning, a driving current to be supplied to the LD 107 immediately after execution of the second APC for printing light emission, becomes I1+I2 obtained by superimposing I2 on I1. This appears as overshoot. Thereafter, the driving current Idrv (=I2−I1) is adjusted to be decreased so that I1+Idrv=I2 is satisfied. The light amount level corresponding to the driving current I1+I2 might exceed a rated level Plimit. In order to prevent the driving current I1+I2 from exceeding the Plimit, it is necessary to switch to the APC for weak light emission before a value of Idrv reaches a predetermined current value during adjustment time period, by executing the first APC for printing light emission. The predetermined current value may be Ilimit−I1, when the driving current corresponding to Plimit is Ilimit, or may be a value less than to Ilimit−I1.

Further, as represented by a dashed line FIG. 13, since the laser beam has a characteristic that the threshold value current Ith becomes larger by temperature rise or degradation, a value of the driving current Ib and Ilimit corresponding to the weak light emission level Pb becomes also larger (I1′,Ilimit′ in FIG. 13). However, an inclination of a characteristic of a region where the threshold value current Ith is exceeded is substantially constant regardless of a change of Ith. Therefore, if located in a region where Ib and Ilimit exceeds Ith, a value of Ilimit−Ib is substantially constant regardless of a change of Ith.

In a case where the APC for printing light emission is first performed, the laser beam driving current Idrv becomes gradually larger from 0. Therefore, the predetermined time T8 is set as a time period during which a value of the driving current Idrv becomes Ilimit−Ib, when the APC for printing light emission has been executed, or as a time period shorter than the time period during which the value of the driving current Idrv becomes Ilimit−Ib. In other words, the predetermined time T8 may be any given value, as long as it is a time that falls within a range in which Idrv meets Idrv≤Ilimit−Ib. The time may be calculated as a design value based on a result measured in advance. By performing the APC for printing light emission only for the predetermined time T8 set in this way, Idrv will be adjusted to become Idrv_ini (Idrv_ini≤Ilimit−Ib) In other words, when the APC for printing light emission is performed only for the predetermined time T8, by the APC (third adjustment step) the driving current Idrv is adjusted to emit light at a light emission level (third light emission intensity) lower than the light emission level (second light emission intensity) for normal printing, with the driving current Idrv_ini.

Figure 14A:
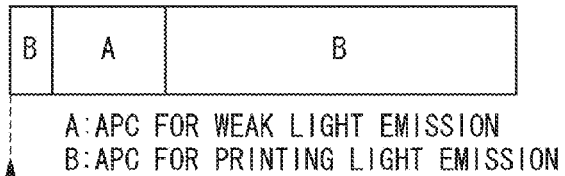
FIGS. 14A to 14E are diagrams illustrating temporal changes of laser driving current, laser light amount, BD signal, rotational speed of scanner motor, in the processing of startup sequence.
Figure 14B:
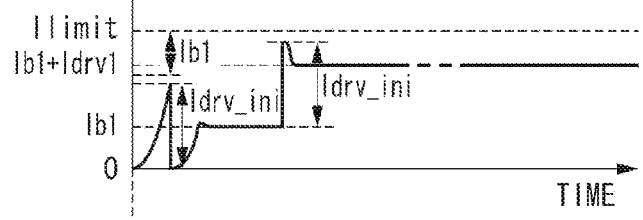
Figure 14C:
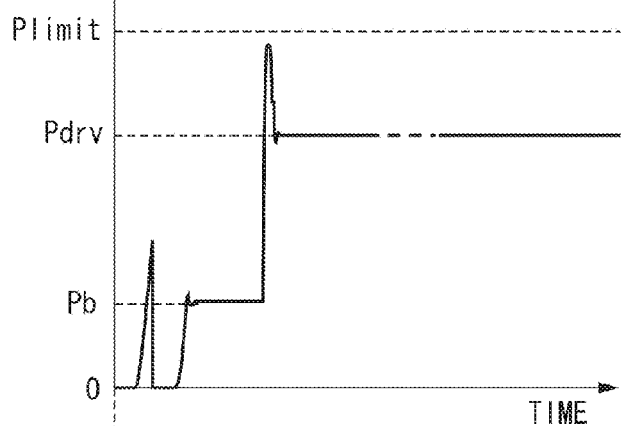
Figure 14D:
Figure 14E:
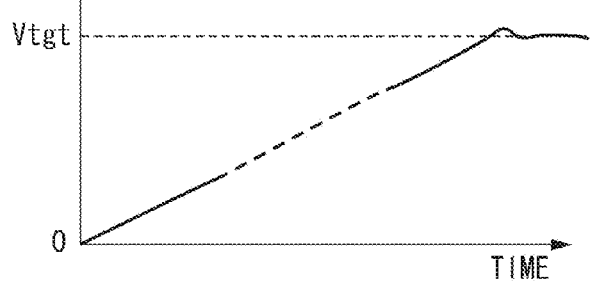

FIG. 14 (including FIGS. 14A to 14E) is a diagram illustrating temporal change of FIG. 14A operation modes, FIG. 14B temporal change of laser beam driving currents, FIG. 14C temporal change of laser beam light amounts, FIG. 14D temporal change of BD signals, and FIG. 14E temporal change of rotational speeds of the scanner motor, in the processing of the startup sequence in FIG. 12. In FIGS. 14A, 14B, and 14C, when the scanner motor 120 is started up, execution of the APC for printing light emission is started, and when the predetermined time T8 has elapsed, the CPU 1222 switches the operation to the APC for weak light emission. The driving current Idrv becomes Idrv_ini. Thereafter, the CPU 1222 starts executing the APC for weak light emission, and the driving current Ib is adjusted to Ib1 corresponding to the weak light emission level Pb. Next, by executing the second APC for printing light emission, adjustment of the driving current Idrv is started from a driving current obtained by superimposing Idrv_ini on Ib1 in the middle of adjustment. Since a light amount level corresponding to the driving current at that time is a value less than or equal to the rated level Plimit, excess of rating due to overshoot does not occur. Thereafter, the driving current Idrv is adjusted to Idrv=Idrv1 to become the driving current Ib1+Idrv1 corresponding to the printing light emission level Pdrv.

Further, in FIGS. 14A, 14D, and 14E, the CPU 1222 starts up the scanner motor 120, which is driven and rotated in an acceleration state, and executes the APC for printing light emission. After the predetermined time T8 has elapsed, the CPU 1222 executes the APC for weak light emission. During the time period T8, a light emission level is in a state where Idrv in the middle of adjustment is supplied the LD 107, the rotational speed V of the scanner motor 120 is less than or equal to the target speed Vtgt, and accordingly the accelerated state of the scanner motor 120 is maintained. Since then, the processing is similar to those in the first exemplary embodiment, and therefore descriptions thereof will not be repeated.

As described above, in the present exemplary embodiment, when the CPU 1222 executes first the APC for printing light emission, the CPU 1222 ends the APC for printing light emission before adjustment of the driving current Idrv has been completed, and the CPU 1222 starts up the laser scanner to execute the APC for weak light emission. Accordingly, the driving current can be prevented from overshooting at the time of the second APC for printing light emission, even if the CPU 1222 has performed first the APC for printing light emission, when the LD 107 emits light in the light emission state at two levels of the weak light emission level Pb, and the printing light emission level Pdrv. Therefore, it becomes possible to efficiently adjust Ib and Idrv. In other words, it becomes possible to appropriately adjust Ib and Idrv so that one light-emitting element emits light at two light emission intensities.

The startup sequence according to the present exemplary embodiment may be configured, similarly to the second exemplary embodiment, to repeatedly perform a plurality of times the APC for printing light emission and the APC for weak light emission. Further, like the third exemplary embodiment, the startup sequence may be configured to repeatedly execute the executions of the APC for weak light emission and the APC for printing light emission, and the non emitting period which the laser beam isn't emitted.

Further, in the processing in step S403, the predetermined time T8 may be also set variably, according to a light amount at the weak light emission level which is set variably depending on environment or degradation of the photosensitive drum. Specifically, it is only necessary to prepare a plurality of values of the predetermined time T3 in advance, which depend on degradation status of the photosensitive drum or environment, and detect or predict the degradation status of the photosensitive drum or environment to regularly reset the predetermined time T8. Further, the predetermined time T8 may be reset when a light amount at the weak light emission level is reset. Further, a light amount of the weak light emission level is reset depending on degradation of the photosensitive drum or environment. Accordingly, without preparing a plurality of predetermined times T8, the predetermined time T8 may be obtained by a calculation based on a change ratio of the light amount when the light amount of the weak light emission level is reset.

In a fifth exemplary embodiment of the present invention, the laser driving system circuit will be described in which the driving current Ib can be set in advance to a predetermined value, even when the APC for printing light emission has been executed first. Since the configuration of the image forming apparatus according to the present exemplary embodiment, and the configurations of the optical scanning device 9 are similar to those in the first exemplary embodiment, descriptions thereof will not be repeated.

Figure 15:
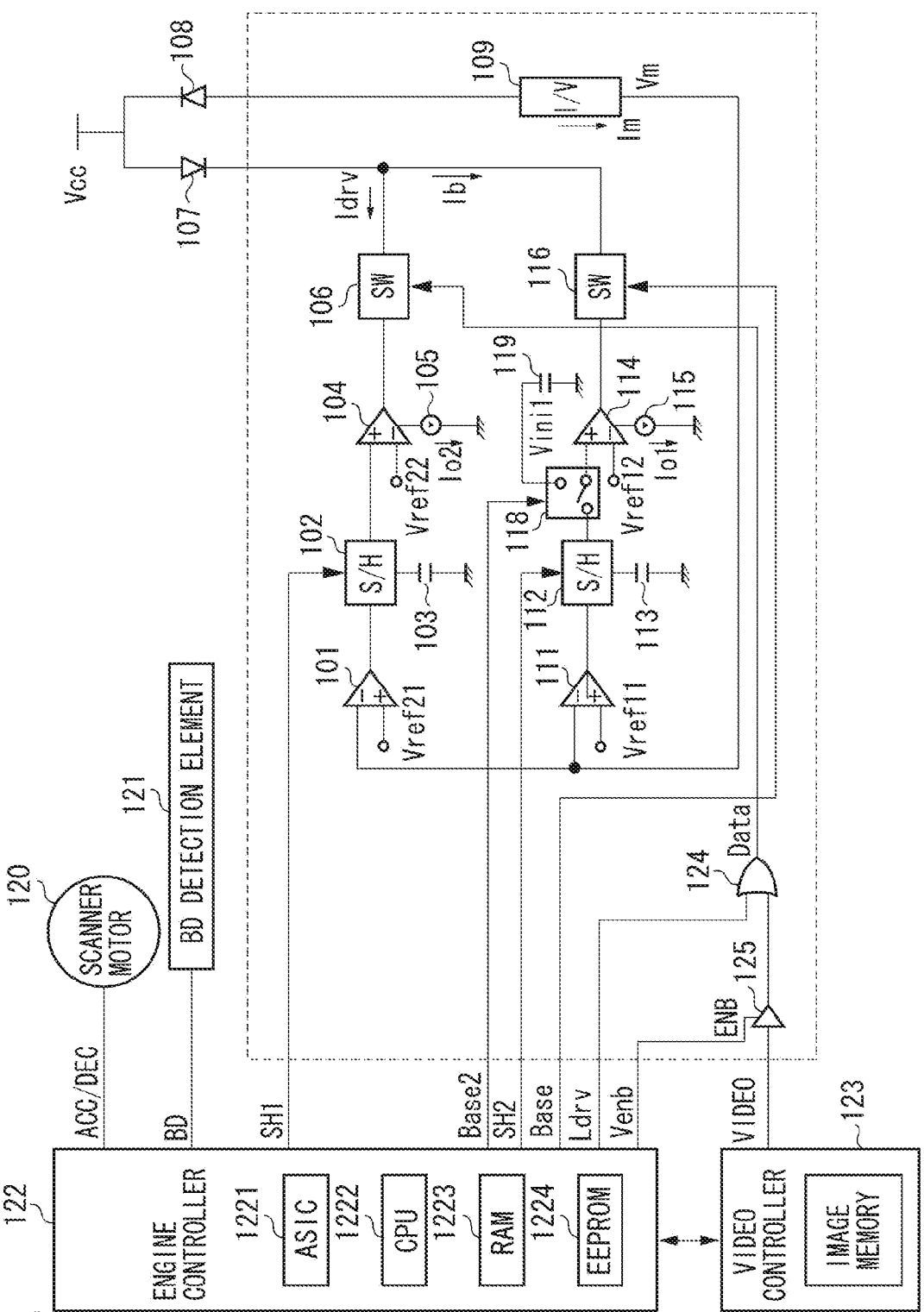
FIG. 15 is a diagram illustrating laser driving circuit.

FIG. 15 is the same as FIG. 3 except that a capacitor 119, a switch 118, and a Base2 signal that controls the switch 118 are added to the laser driving system circuit. The capacitor 119 is connected to one end of the switch 118, and the sample and hold circuit 112 is connected to the other end.

In a case where the switch 118 connects the sample and hold circuit 112 and the current amplifier circuit 114 by the Base2 signal, the CPU 1222 performs the APC operation corresponding to a state of the sample and hold circuit 112, similarly to the first exemplary embodiment. On the other hand, in a case where the switch 118 connects the capacitor 119 and the current amplifier circuit 114, at the time of power-on, a predefined current Iini1 corresponding to a difference between a predefined voltage Vini1 accumulated in the capacitor 119 and a reference voltage Vref12 is determined, which is supplied to the LD 107 as the driving current Ib. The predefined current Iini1 sets, as described below, a predetermined voltage Vini1 to be accumulated in the capacitor 119 after power-on, so that Iini1 takes a value between Ib and Ib+Idrv.

Hereinbelow, operation of the laser driving system circuit in FIG. 15 will be described centering on the changed points, by changing a part of the processing of the startup sequence flowchart in FIG. 12. In step S402, the CPU 1222 instructs execution of the APC for printing light emission, and controls the capacitor 119 and the current amplifier circuit 114 to be in a connected state by the Base2 signal. In other words, Iini1 (the second driving current of the predetermined value) will be supplied to the LD 107, as the predetermined value of Ib. Accordingly, the driving current of Iini1+Idrv is supplied to the LD 107. Next, in step S403, the CPU 1222 waits until the predetermined time has elapsed. The predetermined time T8 only needs to be a time long enough to complete adjustment of Idrv, similarly to the first exemplary embodiment. Accordingly, the driving current Idrv is adjusted to become Idrv_ini in which a light amount of the LD 107 corresponding to Iini1+Idrv becomes the printing light emission level Pdrv.

Figure 16A:
FIGS. 16A to 16E are diagrams illustrating temporal changes of laser driving current, laser light amount, BD signal, rotational speed of scanner motor, in the processing of startup sequence.
Figure 16B:
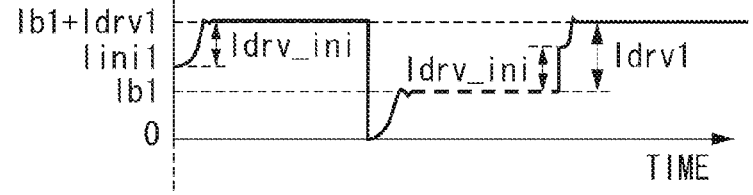
Figure 16C:
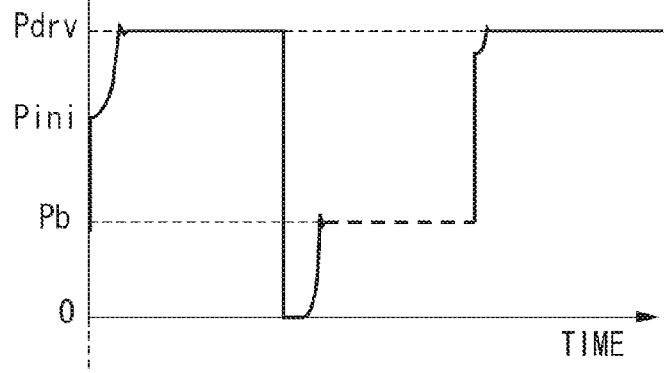

Vini1 is desirably set such that Iini1 becomes a value equal to or greater than Ib1 which makes a light amount level Pb, and Iini1 becomes less than Ib1+Idrv1 which makes a light amount level Pdrv. When that happens, Idrv is always adjusted to a value less than or equal to Idrv1, and it becomes possible to prevent occurrence of overshoot when the second APC for printing light emission is executed Next in step S404, the CPU 1222 instructs execution of the APC for weak light emission, as well as controls the Base2 signal to cause the sample and hold circuit 112 and the current amplifier circuit 114 to enter into a connected state. In the processing thereafter (steps S405 to S408), the CPU 1222 performs APC while continuing the connected state. Since the processing in steps S405 to S408 is similar to those in the fourth exemplary embodiment, descriptions thereof will not be repeated FIG. 16 (including 16A to 16E) is a diagram illustrating temporal change of FIG. 16A operation mode, of FIG. 16B laser beam driving current, of FIG. 16C laser beam light amount, of FIG. 16D BD signal, and of FIG. 16E rotational speed of the scanner motor, in the processing of the startup sequence according to the present exemplary embodiment in FIG. 12. In FIGS. 16A, 16B, and 16C, when starting up the scanner motor, the CPU 1222 starts execution of the APC for printing light emission. At that time, adjustment of Idrv is started from a state based on Iini1 supplied by Vini1 accumulated in the capacitor 119, and a value of Idrv becomes Idrv_ini. Thereafter, Ib is adjusted to Ib1 by executing the APC for weak light emission. Next, adjustment of Idrv is started from a state of Ib1+Idrv_ini, by executing the second APC for printing light emission, and a value of Idrv becomes Idrv1

Figure 16D:
Figure 16E:
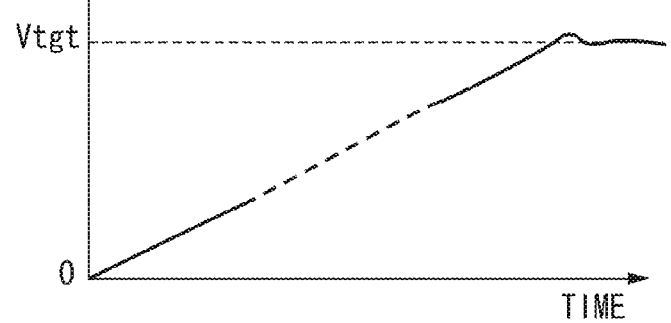
Figure 17:
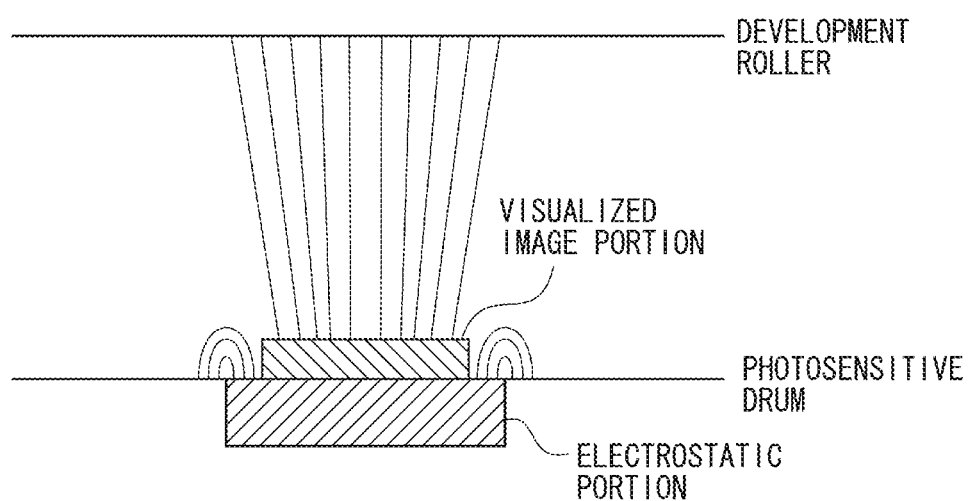
FIG. 17 is a diagram for illustrating details of the "white gap" phenomenon in known technology.

Further, in FIGS. 16A, 16D, and 16E, while the BD signal is generated from the BD element 121 during execution of the first APC for printing light emission, the acceleration state is maintained, since Vtgt is not yet reached. Thereafter, the processing is similar to those in the first exemplary embodiment, and therefore descriptions thereof will not be repeated.

As described above, in the present exemplary embodiment, the APC for printing light emission is executed first, while causing the driving current Iini1 set in advance to flow. Thereafter, after the APC for weak light emission has been performed, the laser scanner is started up to perform the second APC for printing light emission, while the driving current Ib adjusted by the APC for weak light emission is flowing. Accordingly, the driving current can be prevented from overshooting at the time of the second APC for printing light emission, even when the APC for printing light emission has been performed first, in a case where the LD 107 emits light in light emission states at two levels of the weak light emission level Pb, and at the printing light emission level Pdrv. Therefore, it becomes possible to efficiently adjust Ib and Idrv. In other words, it becomes possible to appropriately adjusts Ib and Idrv and one light-emitting element emits light at two light emission intensities The startup sequence of the present exemplary embodiment may be configured, similarly to the second exemplary embodiment, to repeatedly perform the APC for printing light emission and the APC for weak light emission. Further, similarly to the third exemplary embodiment, executions of the APC for weak light emission, and the APC for printing light emission, and the non emitting period which the laser beam isn't emitted may be repeatedly executed a plurality of times.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2012-131291 filed Jun. 8, 2012, which is hereby incorporated by reference herein in its entirety.

What is claimed is:

1. An image forming apparatus comprising:
   a photosensitive member;
   a light-emitting element for emitting a laser beam;
   a driving unit configured to drive the light-emitting element by a driving current, wherein the driving unit causes the light-emitting element to emit light at a first light emission intensity and at a second light emission intensity in a laser light emission region lower than the first light emission intensity;
   a polygon mirror configured to scan the photosensitive member with the laser beam by rotating at a predetermined speed; and
   a developing unit configured to form an image on the photosensitive member by causing toner to adhere to the photosensitive member scanned with the laser beam,
   wherein the driving unit causes the light-emitting element to emit light at the first light emission intensity toward an image portion within an image forming region on the photosensitive member where toner is to be adhered, and causes the light-emitting element to emit light at the second light emission intensity in the laser light emission region toward a non-image portion within an image forming region on the photosensitive member where toner is not to be adhered, the second light emission intensity is larger than an emission intensity of a laser emission emitted from the light-emitting element and the second light emission intensity is an emission intensity which causes toner not to adhere to the photosensitive member,
   wherein the driving unit causes the light-emitting element to emit light at the first light emission intensity with a driving current obtained by adding a second driving current to a first driving current, and causes the light-emitting element to emit light at the second light emission intensity in the laser light emission region with the second driving current,
   wherein the driving unit performs a first adjustment adjusting the first driving current for causing the light-emitting element to emit light at the first light emission intensity, and a second adjustment adjusting the second driving current for causing the light-emitting element to emit light at the second light emission intensity in the laser light emission region, and
   wherein the driving unit performs the first adjustment and the second adjustment during a time period after the polygon mirror starts rotating until the predetermined speed is reached, and
   wherein, during the time period, the driving unit initially performs the second adjustment before the first adjustment is performed.

2. The image forming apparatus according to claim 1, wherein after having performed the second adjustment, the driving unit performs the first adjustment for causing the light-emitting element to emit light at the first light emission intensity with a driving current obtained by adding the second driving current to the first driving current to adjust the first driving current.

3. The image forming apparatus according to claim 1, wherein the driving unit, during a time period after the polygon mirror starts rotating until the predetermined speed is reached, alternately executes the first adjustment and the second adjustment a plurality of times.

4. The image forming apparatus according to claim 1 wherein the driving unit, during a time period after the polygon mirror starts rotating until the predetermined speed is reached, is provided with at least one time period during which the light-emitting element is not caused to emit light.

5. The image forming apparatus according to claim 1, wherein when the polygon mirror reaches another predetermined speed equal to or faster than the speed which is slower than the predetermined speed after the polygon mirror has started rotating, the driving unit performs the first adjustment.

6. The image forming apparatus according to claim 1, further comprising a light receiving unit,
   wherein the light receiving unit is configured to receive laser beams emitted from the light-emitting element and reflected by the polygon mirror, and a value related to a rotational speed of the polygon mirror is detected based on an output from the light receiving unit.

7. The image forming apparatus according to claim 1, wherein the driving unit, while performing the first adjustment, detects a value related to a rotational speed of the polygon mirror.

8. The image forming apparatus according to claim 1,
   wherein the driving unit causes the light-emitting element to emit light at the first light emission intensity for causing toner to adhere to the image portion on the photosensitive member, and causes the light-emitting element to emit light at the second light emission intensity for causing toner not to adhere to the non-image portion on the photosensitive member.

* * * * *